US012567648B2

(12) United States Patent
Marr et al.

(10) Patent No.: US 12,567,648 B2
(45) Date of Patent: Mar. 3, 2026

(54) EXPLOSIVE ENVIRONMENT NEUTRALIZATION IN CHEMICAL ENERGY STORAGE

(71) Applicant: Altect, Inc., Austin, TX (US)

(72) Inventors: Kevin Marr, Austin, TX (US); Paul Lee, Frisco, TX (US)

(73) Assignee: ALTECT, INC., Austin, TX (US)

( * ) Notice: Subject to any disclaimer, the term of this patent is extended or adjusted under 35 U.S.C. 154(b) by 1040 days.

(21) Appl. No.: 17/448,260

(22) Filed: Sep. 21, 2021

(65) Prior Publication Data

US 2022/0094014 A1 Mar. 24, 2022

Related U.S. Application Data

(60) Provisional application No. 63/082,578, filed on Sep. 24, 2020.

(51) Int. Cl.
| | |
|---|---|
| *H01M 50/143* | (2021.01) |
| *B01D 53/00* | (2006.01) |
| *H01M 50/383* | (2021.01) |

(52) U.S. Cl.
CPC .......... *H01M 50/383* (2021.01); *B01D 53/00* (2013.01); *H01M 50/143* (2021.01); *H01M 2200/00* (2013.01)

(58) Field of Classification Search
CPC ............. H01M 50/143; H01M 50/383; H01M 2200/00
See application file for complete search history.

(56) References Cited

U.S. PATENT DOCUMENTS

| | | | |
|---|---|---|---|
| 659,236 | A | 10/1900 | Johnson |
| 4,114,083 | A | 9/1978 | Benham et al. |

(Continued)

FOREIGN PATENT DOCUMENTS

| | | |
|---|---|---|
| CN | 109316687 A | 2/2019 |
| JP | 2003297321 | 10/2003 |

(Continued)

OTHER PUBLICATIONS

Chapter II Demand in related international patent application serial No. PCT/US2021/071531, Jul. 7, 2022, 13 pages.

(Continued)

*Primary Examiner* — Osei K Amponsah
(74) *Attorney, Agent, or Firm* — Definitive Patents, member Synchrony IP; Timothy D. Snowden; Yau H. Chan

(57) ABSTRACT

Apparatus and associated methods relate to a neutralization and circulation module (NCM) configured to generate a combustion suppressant stream from a flammable intake stream. In an illustrative example, the NCM includes an intake port and an output port, each in fluid communication with a chamber containing (electro)chemical energy storage units capable of emitting combustible gases. The NCM may, for example, include a reactor in fluid communication between the intake and output port. The reactor may, for example, selectively apply an oxygen-containing stream from an oxygen source to the intake stream to generate, from the stream containing combustible gases, a combustion suppressant gas stream that is discharged through the output port into the chamber such that an upper flammability limit approaches a lower flammability limit in the chamber. Various embodiments may advantageously eliminate a flammable regime in a chemical energy storage environment.

20 Claims, 12 Drawing Sheets

(56) References Cited

U.S. PATENT DOCUMENTS

| | | | |
|---|---|---|---|
| 5,574,355 | A | 11/1996 | McShane et al. |
| 6,070,365 | A | 6/2000 | Leonard |
| 6,474,420 | B1 | 11/2002 | Adiga |
| 6,592,361 | B2 | 7/2003 | Adiga et al. |
| 6,763,894 | B2 | 7/2004 | Schoenrock et al. |
| 6,959,828 | B2 | 11/2005 | Eijkelenberg et al. |
| 7,087,151 | B2 | 8/2006 | Mizutani et al. |
| 7,153,446 | B2 | 12/2006 | Grigg |
| 7,231,923 | B2 | 6/2007 | Adiga et al. |
| 7,433,794 | B1 | 10/2008 | Berdichevsky et al. |
| 7,798,893 | B2 | 9/2010 | Eijkelenberg et al. |
| 8,474,240 | B1 | 7/2013 | Nail |
| 8,557,416 | B2 | 10/2013 | Mardall et al. |
| 8,726,588 | B2 | 5/2014 | Jakus et al. |
| 8,877,370 | B2 | 11/2014 | Kim |
| 9,046,580 | B2 | 6/2015 | Hermann |
| 9,446,270 | B2 | 9/2016 | Nappa et al. |
| 9,539,448 | B2 | 1/2017 | Jung et al. |
| 9,704,384 | B2 | 7/2017 | Bandhauer et al. |
| 10,003,053 | B2 | 6/2018 | Hartmann et al. |
| 10,396,416 | B2 | 8/2019 | Bowersock et al. |
| 10,420,970 | B2 | 9/2019 | Burkhart et al. |
| 10,468,146 | B2 | 11/2019 | Song et al. |
| 10,601,010 | B2 | 3/2020 | Doyle et al. |
| 11,217,857 | B2 | 1/2022 | Lindstrom |
| 2006/0021759 | A1 | 2/2006 | Golinveaux |
| 2006/0196681 | A1 | 9/2006 | Adiga et al. |
| 2006/0251957 | A1 | 11/2006 | Darcy et al. |
| 2008/0026283 | A1* | 1/2008 | Park .................... H01M 50/578 |
| | | | 429/61 |
| 2008/0187794 | A1 | 8/2008 | Weingaertner |
| 2011/0027632 | A1* | 2/2011 | Higashino ......... H01M 10/6563 |
| | | | 429/83 |
| 2011/0269037 | A1* | 11/2011 | Burmeister ......... H01M 8/2485 |
| | | | 429/415 |
| 2014/0367125 | A1 | 12/2014 | Krager et al. |
| 2016/0308182 | A1 | 10/2016 | Kim |
| 2017/0157442 | A1 | 6/2017 | Huotari et al. |
| 2018/0003685 | A1 | 1/2018 | Cummings et al. |
| 2018/0221695 | A1 | 8/2018 | Shaw et al. |
| 2018/0368613 | A1 | 12/2018 | Welles |
| 2019/0006650 | A1 | 1/2019 | Bryla |
| 2019/0296302 | A1 | 9/2019 | Bianchi et al. |
| 2020/0009412 | A1 | 1/2020 | Rheaume |
| 2021/0299491 | A1 | 9/2021 | Adiga et al. |
| 2022/0094014 | A1 | 3/2022 | Marr |

FOREIGN PATENT DOCUMENTS

| | | | |
|---|---|---|---|
| JP | 2012049038 | | 3/2012 |
| JP | 2013070992 | | 4/2013 |
| JP | 2015125881 | A | 7/2015 |
| JP | 2020113422 | | 7/2020 |
| WO | 2010032313 | A1 | 3/2010 |
| WO | 2017181283 | A1 | 10/2017 |
| WO | 2019057656 | A1 | 3/2019 |
| WO | 2023147501 | A2 | 8/2023 |
| WO | 2023147501 | A3 | 5/2024 |

OTHER PUBLICATIONS

International Preliminary Report on Patentability in related International Application No. PCT/US2021/071531, dated Jan. 19, 2023, 26 pages.

International Search Report and Written Opinion of the International Searching Authority in related international patent application serial No. PCT/US2021/071531. Apr. 14, 2022. 15 pages.

Chapter II Demand filed in related International Application No. PCT/US2023/061493, dated Jul. 15, 2024, 46 pages.

Examination correspondence and patent certificate in related Australian patent No. 2021349359, May 15, 2023-Jun. 6, 2024. 36 pages.

Examination correspondence in related Korean application No. 10-2023-7012516, Dec. 5, 2024-Jun. 16, 2025.

International Preliminary Report on Patentability in related International Application No. PCT/US2023/061493, dated Jan. 2, 2025, 43 pages.

International Search Report and Written Opinion of the International Searching Authority in related International Application No. PCT/US2023/061493, dated Apr. 15, 2024, 9 pages.

Notice of Intention to Grant in related European patent No. EP4218088, May 3, 2024. 55 pages.

Notice of publication of related Chinese application No. CN202180077637, Aug. 15, 2023. 70 pages.

Elder, et al, "Preventing thermal runaway in lithium-ion energy storage systems,", Energy Storage News. https://www.energy-storage.news/blogs/preventing-thermal-runaway-in-lithium-ion-energy-storage-systems (accessed Jul. 23, 2021).

Embertech, LLC, Battery Fires, Embertechs.com, 2019, retrieved from the internet Sep. 21, 2021, https://www.embertech.tech/accomplisments.

L. Barelli et al., "Oxygen reduction approaches for fire protection to increase grid Li-ion BESS safety," E3S Web Conf., vol. 238, p. 09001, 2021, doi: 10.1051/e3sconf/202123809001.

L. Xu et al., "Self-Humidification of a Polymer Electrolyte Membrane Fuel Cell System With Cathodic Exhaust Gas Recirculation," Journal of Electrochemical Energy Conversion and Storage, vol. 15, No. 2, Feb. 2018, doi: 10.1115/1.4038628.

M. Ghiji et al., "A Review of Lithium-Ion Battery Fire Suppression," Energies, vol. 13, No. 19, Art. No. 19, Jan. 2020, doi: 10.3390/en13195117.

Marr, Explosion Ventilation and Circulation (EVAC) Systemfor Li-ion Battery ESS Explosion Prevention, 2020, retrieved from the internet Sep. 17, 2021, https://www.sbir.gov/node/1835579.

Marr, Kevin, Award Abstract # 1913998 STTR Phase I: Thermal Runaway and Pressure Suppression (TRAPS) for Lithium-Ion Batteries, Aug. 9, 2019, retrieved from the internet Sep. 17, 2021, https://nsf.gov/awardsearch/showAward?AWD_ID=1913998&HistoricalAwards=false.

NEC Energy Solutions, "GSS® Design for Safety," Feb. 2019. Accessed: Jul. 23, 2021. [Online]. Available: https://www.neces.com/wp-content/uploads/2019/08/GSS-Safety-Overview-2019-for-web.pdf.

* cited by examiner

140

135

1100

EXPLOSIVE ENVIRONMENT NEUTRALIZATION IN CHEMICAL ENERGY STORAGE

CROSS-REFERENCE TO RELATED APPLICATIONS

This application claims the benefit of U.S. Provisional Application Ser. No. 63/082,578, titled "Fire and explosion mitigation system for hazardous gases released during battery failures," filed by Kevin Marr and Paul Lee on Sep. 24, 2020.

This application incorporates the entire contents of the foregoing application(s) herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of 1913998 awarded by the National Science Foundation and/or DE-SC0020771 awarded by the Department of Energy.

TECHNICAL FIELD

Various embodiments relate generally to conversion of gaseous chemicals.

BACKGROUND

Energy may be harvested from various sources. For example, hydraulic energy may be harvested using hydroelectric generators. Solar energy may, for example, be harvested using photovoltaic cells. Chemical energy may, for example, be harvested using internal combustion engine.

Energy may, for example, be converted into various forms. Electricity is a common form for use. Energy in the form of electricity may, for example, be used to provide motive power for transport, power computational devices, and enables humans to investigate the universe from microcosms to galaxies. Energy converted to electricity may be stored in chemical form.

SUMMARY

Apparatus and associated methods relate to a neutralization and circulation module (NCM) configured to generate a combustion suppressant stream from a flammable intake stream. In an illustrative example, the NCM includes an intake port and an output port, each in fluid communication with a chamber containing (electro)chemical energy storage units capable of emitting combustible gases. The NCM may, for example, include a reactor in fluid communication between the intake and output port. The reactor may, for example, selectively apply an oxygen-containing stream from an oxygen source to the intake stream to generate, from the stream containing combustible gases, a combustion suppressant gas stream that is discharged through the output port into the chamber such that an upper flammability limit approaches a lower flammability limit in the chamber. Various embodiments may advantageously eliminate a flammable regime in a chemical energy storage environment.

Various embodiments may achieve one or more advantages. For example, some embodiments may advantageously eliminate a flammability region over time. Some NCM embodiments may, for example, advantageously create and/or maintain inherently safe conditions by removing flammable species. Various embodiments may, for example, reduce flammability limits in a chemical energy storage environment.

Various embodiments may advantageously create and/or maintain a safe environment even as combustible and/or toxic gaseous species are released into an environment. For example, embodiments may advantageously suppress flammability in an energy storage environment. Various embodiments may advantageously use toxic and/or combustible gases as feedstock to produce a combustion-suppressant stream.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an exemplary neutralization and circulation module (NCM) is introduced with reference to FIGS. 1-6. Second, that introduction leads into a description with reference to FIGS. 7-8 of some exemplary embodiments of NCMs. Third, with reference to FIGS. 9-10, exemplary methods of operating NCMs are described. Fourth, with reference to FIG. 11, the discussion turns to exemplary methods of configuring NCMs. Finally, the document discusses further embodiments, exemplary applications and aspects relating to NCMs.

Figure 1A:
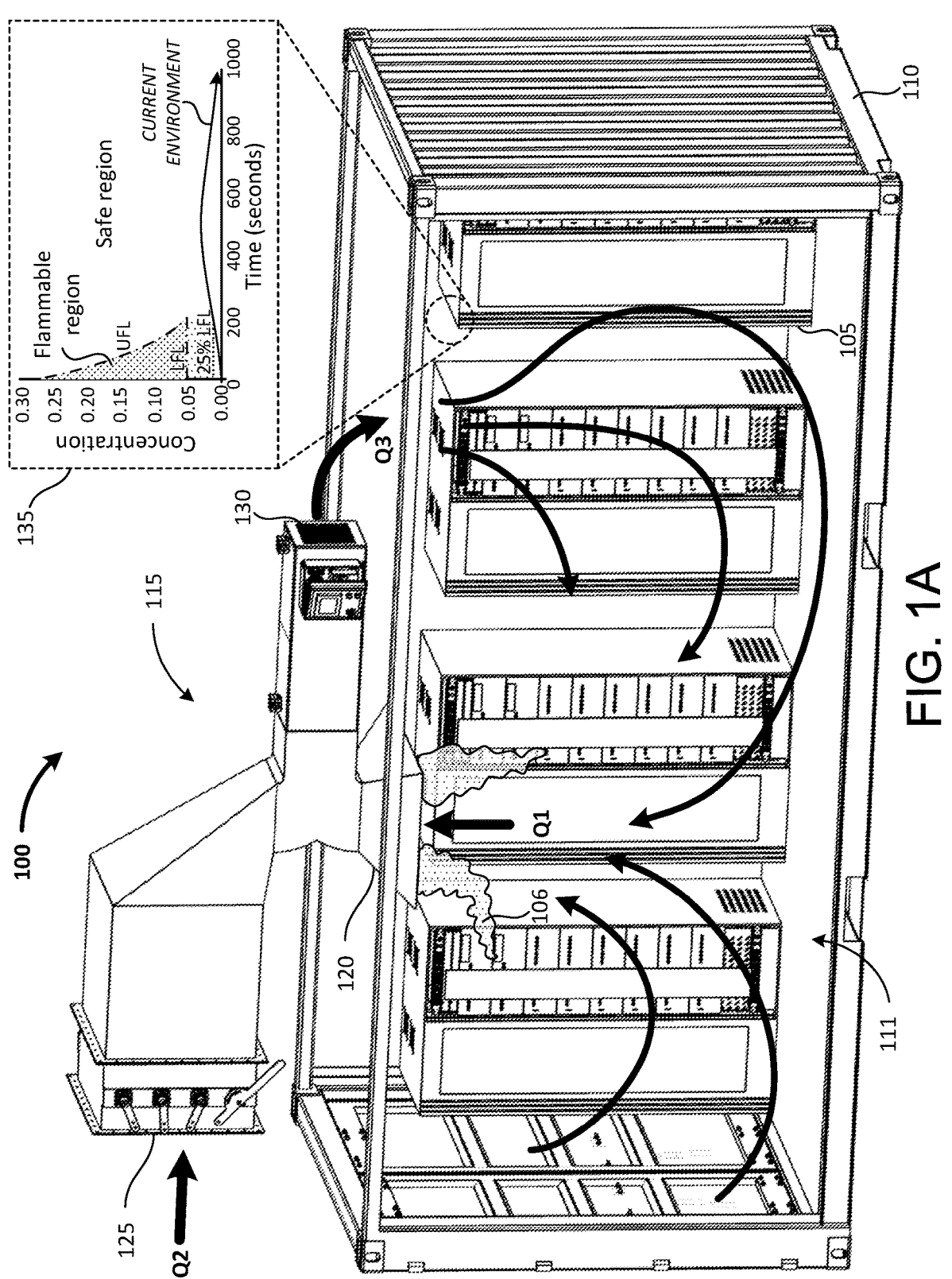
FIG. 1A depicts an exemplary neutralization and circulation module (NCM) employed in an illustrative use-case scenario.

FIG. 1A depicts an exemplary neutralization and circulation module (NCM) employed in an illustrative use-case scenario. In an exemplary scenario 100, multiple chemical energy storage modules 105 are disposed in a container 110. The container 110 defines a chamber 111. The chamber 111 may, for example, be closed when the container 110 is in a closed (e.g., sealed) mode.

The chemical energy storage modules 105 may, for example, include electrochemical energy storage modules. For example, the (electro)chemical energy storage modules may include (rechargeable) battery units. In an exemplary embodiment, the battery units may include lithium-based chemistry. The battery units may, by way of example and not limitation, include lithium-ion batteries. During operation, the chemical energy storage modules 105 may emit gaseous compositions 106. The gaseous compositions 106 may, for example, include flammable components. The gaseous compositions 106 may include explosive components. The gaseous compositions 106 may include toxic components. For example, the chemical energy storage modules 105 may reach an elevated temperature, causing the chemical energy storage modules 105 to emit gaseous compositions 106 that is explosive and/or toxic. Accordingly, the chamber 111 defined by the container 110 may, for example, become explosive and/or toxic.

In such an environment, a simple act of opening a door by a maintenance technician and/or starting of a fan in a ventilation system may introduce a spark and/or fuel (e.g., oxygen) into the chamber 111 and initiate an explosion. Even if explosion does not occur, personnel (e.g., maintenance technicians, emergency responders) may unwittingly enter a hazardous (e.g., toxic, flammable) environment.

Heated particulates ejected from the chemical energy storage modules 105 may, for example, initiate an explosion in such an explosive environment. A heated surface of the chemical energy storage modules 105 may, for example, ignite an explosion. Spark(s) from electrical equipment may, for example, ignite an explosion.

In the depicted example, a neutralization and circulation module (NCM 115) is coupled in fluid communication with the chamber 111 defined by the container 110. The NCM 115 is provided with an intake port 120 include communication with the chamber 111. The NCM 115 is further provided with an oxygen intake port 125 in (controlled) fluid communication with a source of oxygen (e.g., oxygen-containing gas). The NCM 115 further includes an output port 130 in fluid communication with the chamber 111. In some embodiments the oxygen containing gas may, for example, include ambient air. Oxygen containing gas may, for example, include an oxygen-rich source.

As depicted, the NCM 115 is operated to receive an intake stream (Q1) via the intake port 120. The intake stream Q1 may, for example, include the gaseous compositions 106 (as depicted). In response to receiving the intake stream Q1, the NCM 115 selectively applies an oxygen containing stream (Q2) retrieved via the oxygen intake port 125 to the intake stream Q1 in a reactor. The NCM 115 thereby neutralizes the combustible and/or toxic gases and generates, from the intake stream Q1 and the oxygen containing stream Q2, a combustion suppressant gas stream (Q3). The NCM 115 discharges the combustion suppressant gas stream Q3 via the output port 130.

In various embodiments, neutralization may, for example, include physiochemical processes. Such processes may, for example, reduce or eliminate (target) combustible and/or toxic gas specie(s). The process(es) may, for example, be configured to reduce or eliminate a hazard from such gas specie(s). In some embodiments, physiochemical processes may, by way of example and not limitation, neutralize combustible and/or toxic gas species by inducing one or more reactions. The reactions may, for example, consume the toxic and/or combustible gas species as a reactant. At least one combustion-suppressant gas species may, for example, be a product of such a reaction.

In some embodiments physiochemical processes may, for example, include catalyst-mediated processes. Some embodiments may, for example, utilize physiochemical processes including combustion.

In some embodiments physiochemical processes may, for example, include physical removal. Physical removal may at least partially neutralize (hazards in an electrochemical storage environment as a result of) one or more toxic and/or combustible gas species. Some embodiments may, by way of example and not limitation, include a substrate in a reactor. The substrate may, for example, be configured to absorb and/or adsorb one or more toxic and/or combustible gas species. As an illustrative example, a nickel catalyst may be provided to absorb and/or adsorb one or more target (e.g., combustible, toxic) gas species.

In various embodiments, an oxygen-containing stream may, for example, be a reactant in a physiochemical process. The oxygen-containing stream may, for example, include water vapor. The water vapor may, for example, provide oxygen in one or more reactions. Some embodiments may, for example, apply one or more reactants other than oxygen. For example, some embodiments may provide multiple reactants. The multiple reactants may, by way of example and not limitation, include oxygen.

In the exemplary scenario 100, a chemical profile of the environment is depicted in a plot 135. As depicted in the plot 135 (discussed in further detail with reference to FIG. 1B), operation of the NCM 115 over time to withdraw from the chamber 111 flammable gases (e.g., including the gaseous compositions 106) and to generate therefrom and discharge into the chamber 111 a combustion suppressant gas stream Q3 operates to suppress a flammable region over time. Various embodiments of the NCM 115 may advantageously eliminate a flammability region over time. In various embodiments, the NCM 115 may advantageously create and/or maintain inherently safe conditions by removing flammable species, reducing flammability limits in the chamber 111, or some combination thereof.

Figure 1B:
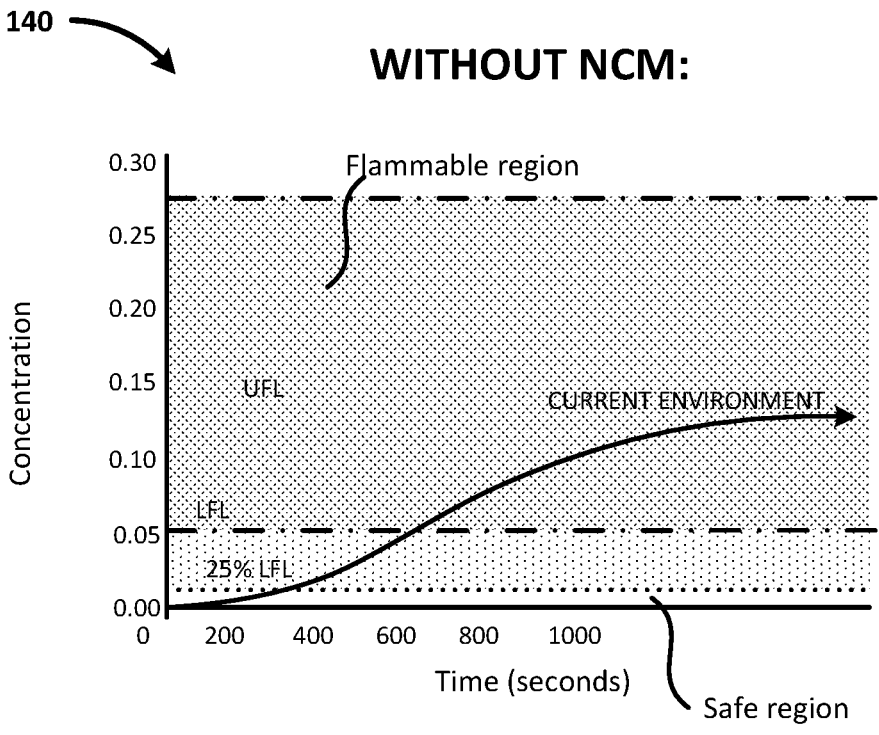
FIG. 1B depicts an exemplary concentration profile over time of a chemical energy storage environment with and without an NCM.
Figure 1B:
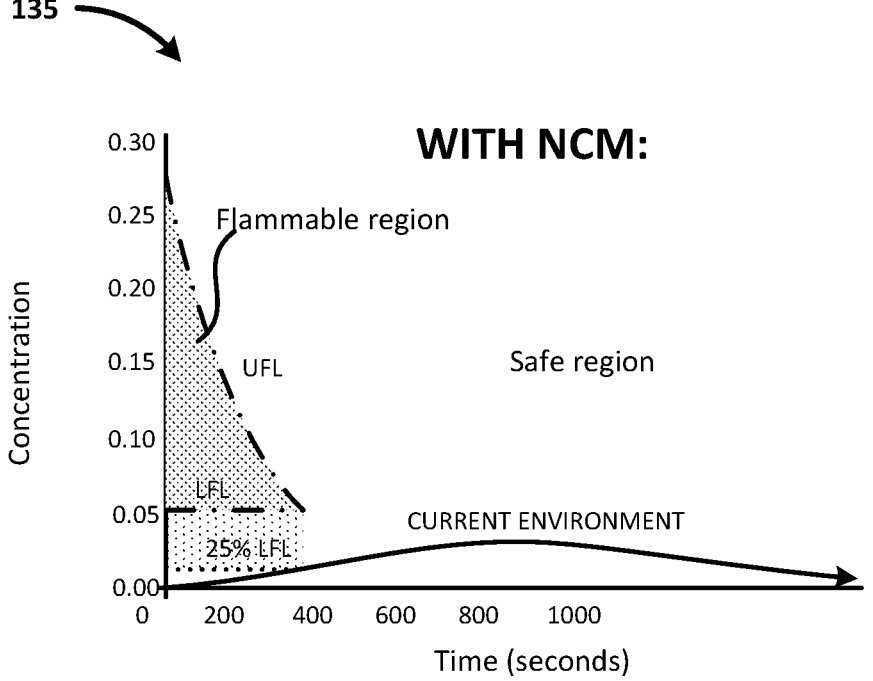

FIG. 1B depicts an exemplary concentration profile over time of a chemical energy storage environment with and without an NCM. These simulations depict a concentration (e.g., measured in % Volume) of flammable gases in the environment of a 40-foot energy storage system (ESS) (e.g., the chamber 111) over time. An initial time (t=0) may, for example, correspond to the onset of a release of combustible gases. Such an event may, for example, correspond to a thermal event, a battery failure releasing combustible gases, or some combination thereof.

In the depicted example, as (gaseous) combustible species are released, a flammable region (e.g., range of concentrations) is defined by a lower flammability limit (LFL) and an upper flammability limit (UFL). The flammable region may, for example, define a range in which the gaseous composition will sustain a combustion reaction (e.g., 'burn'), such as, for example, in the presence of oxygen. Depending on a thermal energy level (e.g., temperature) and/or composition, the gaseous composition may ignite in the presence of oxygen when in at least a portion of the flammable region.

In the plot 135 (e.g., corresponding to the exemplary scenario 100) and in the plot 140 (e.g., corresponding to the exemplary scenario 100 in the absence of the NCM 115), the UFL is about 27% (0.27 out of 1). The LFL is about 5%. In the exemplary scenario corresponding to the plot 140, the concentration begins in a safe region (e.g., less than about 1-2%). The safe region may, as depicted, be defined as up to 25% of the LFL. For example, a failing lithium-ion battery unit may be off gassing (e.g., during a thermal runaway event). As time progresses, and flammable species continue to be emitted, the concentration of flammable species continues to rise out of a safe region and into a dangerous zone between the 25% LFL level and the LFL. As time continues to progress without mitigation, the concentration of the flammable species continues to rise into the flammable region. In such an environment, a high likelihood of combustion may exist. For example, a spark, admission of oxygen, elevated temperature (e.g., which may be common in a thermal runaway event the corresponding to a release of flammable species), or some combination thereof may initiate a combustion reaction and cause a fire and/or explosion.

In the exemplary scenario corresponding to the plot 135, the concentration begins in the safe region. As time progresses, and flammable species continue to be emitted, the concentration of flammable species continues to rise toward the 25% LFL level. However, in the depicted example, the NCM 115 is operating to remove the flammable gases from the environment and to generate, from the flammable gases, a combustion suppressant stream.

The combustion suppressant stream may, for example, include one or more inert species. As the combustion suppressant stream is released back into the environment, the inert species suppress the UFL. As time goes on in the depicted example, the UFL intersects the LFL, thereby eliminating the flammable region. Thus, even when the concentration of combustible species rises above what was previously the 25% LFL level (e.g., at about 200-250 seconds), the environment is still safe because the flammable region has been eliminated. As the NCM 115 continues to operate, the concentration of flammable gases is suppressed. Accordingly, various embodiments may advantageously create and/or maintain a safe environment even as combustible and/or toxic gaseous species are released into an environment.

Figure 2:
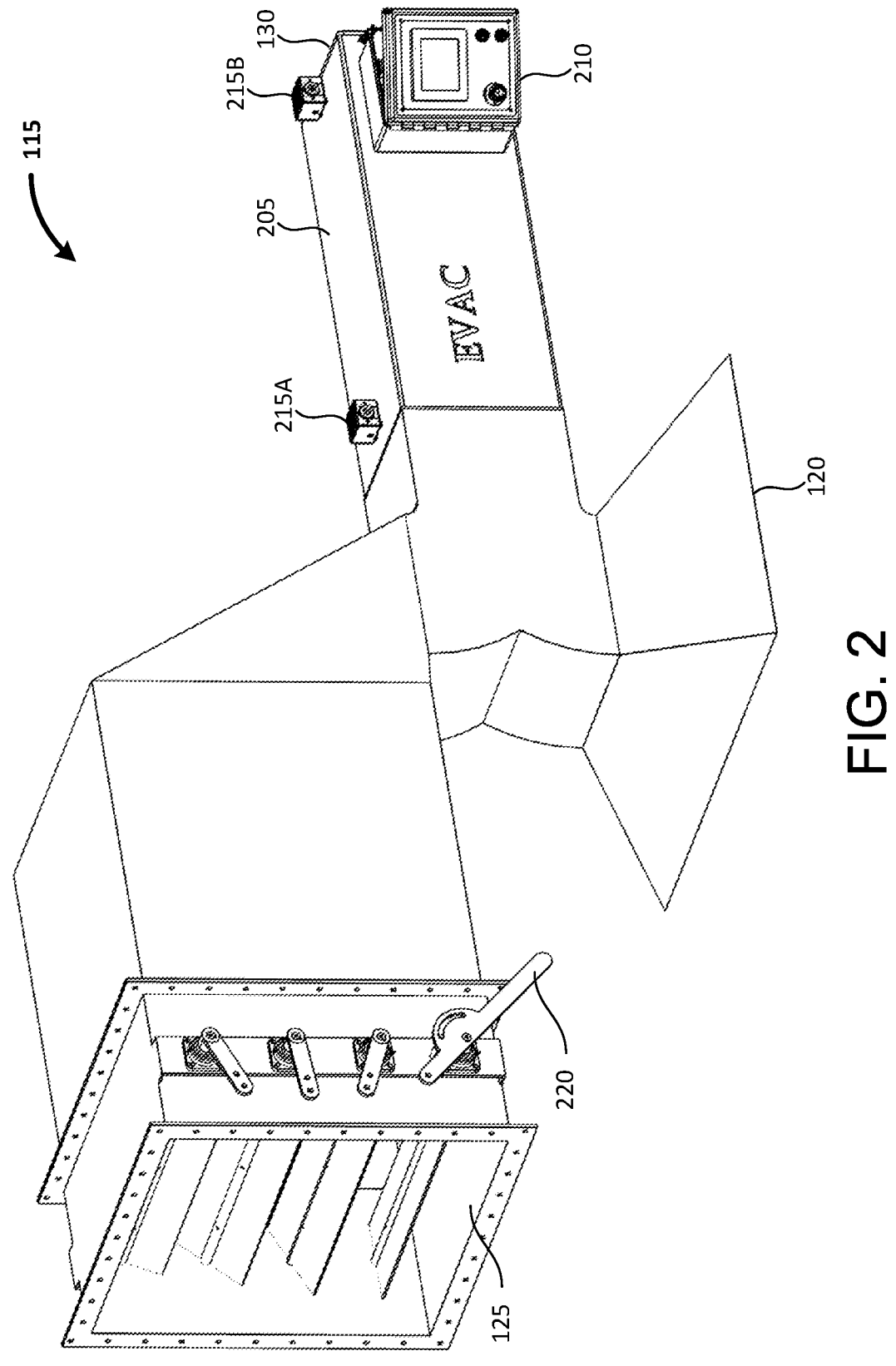
FIG. 2 depicts a perspective view of the exemplary NCM.

FIG. 2 depicts a perspective view of the exemplary NCM. As depicted, the NCM 115 includes a reactor 205. The reactor 205 is operably coupled (e.g., mechanically coupled, electrically coupled) to a controller 210. The controller 210 may, for example, be configured to operate the reactor 205. The controller 210 may, for example, be configured to operate components of the NCM 115 other than the reactor 205.

In the depicted example the reactor 205 is provided with a first sensor module 215A and a second sensor module 215B. The first sensor module 215A and the second sensor module 215B may, for example, be operably coupled to the controller 210. The controller 210 may operate the reactor 205 and/or other components of the NCM 115 in response to signal(s) from the first sensor module 215A and/or the second sensor module 215B.

The first sensor module 215A may, for example, be configured to detect attributes of the intake stream Q1 entering the reactor 205 via the intake port 120. The first sensor module 215A may, for example, be configured to detect attributes of the oxygen containing stream Q2 via the oxygen intake port 125. The first sensor module 215A may, for example, be configured to detect attributes of a combined stream (e.g., Q1+Q2) in a proximal end of the reactor 205.

The second sensor module 215B may, for example, be configured to detect attributes of the output stream Q3.

In various embodiments sensor module(s) may, for example, be configured to detect specie(s) of a gas stream. For example, a sensor module may be configured to detect the presence and/or absence of at least one analyte. A sensor module may be configured to detect a concentration of at least one analyte. A sensor module may be configured to detect an oxygen level of a gas stream. A sensor module may be configured to detect a flammable specie(s) concentration in a gas stream. A sensor module may be configured to detect an inert specie(s) concentration in a gas stream.

In various embodiments sensor module(s) may, for example, be configured to detect a thermal energy level. For example, a sensor module may be configured to detect a temperature of a gas stream. Some embodiments may, for example, monitor a temperature of an intake stream. Some embodiments may monitor a temperature of an output stream. Some embodiments may, for example, monitor a temperature external to the NCM 115 (e.g., of the chamber 111). A sensor module may be configured to monitor a temperature of the reactor 205. For example, a sensor module may be configured to monitor temperature of at least one reaction module within a reactor.

The NCM 115 further includes a fluid control element 220. As depicted, the fluid control element 220 is configured to control intake via the oxygen intake port 125. The fluid control element 220 may, for example, be operably coupled to the controller 210. The controller 210 may selectively operate the fluid control element 220 to control at least one characteristic of the oxygen-containing stream Q2. For example, the controller 210 may operate the fluid control element 220 in response to signal(s) received from the first sensor module 215A and/or the second sensor module 215B. The controller 210 may operate the fluid control element 220 to maintain a (predetermined) minimum oxygen level in the reactor 205. The controller 210 may operate the fluid control element 220 to maintain a (predetermined) maximum oxygen level in the reactor 205.

Figure 3:
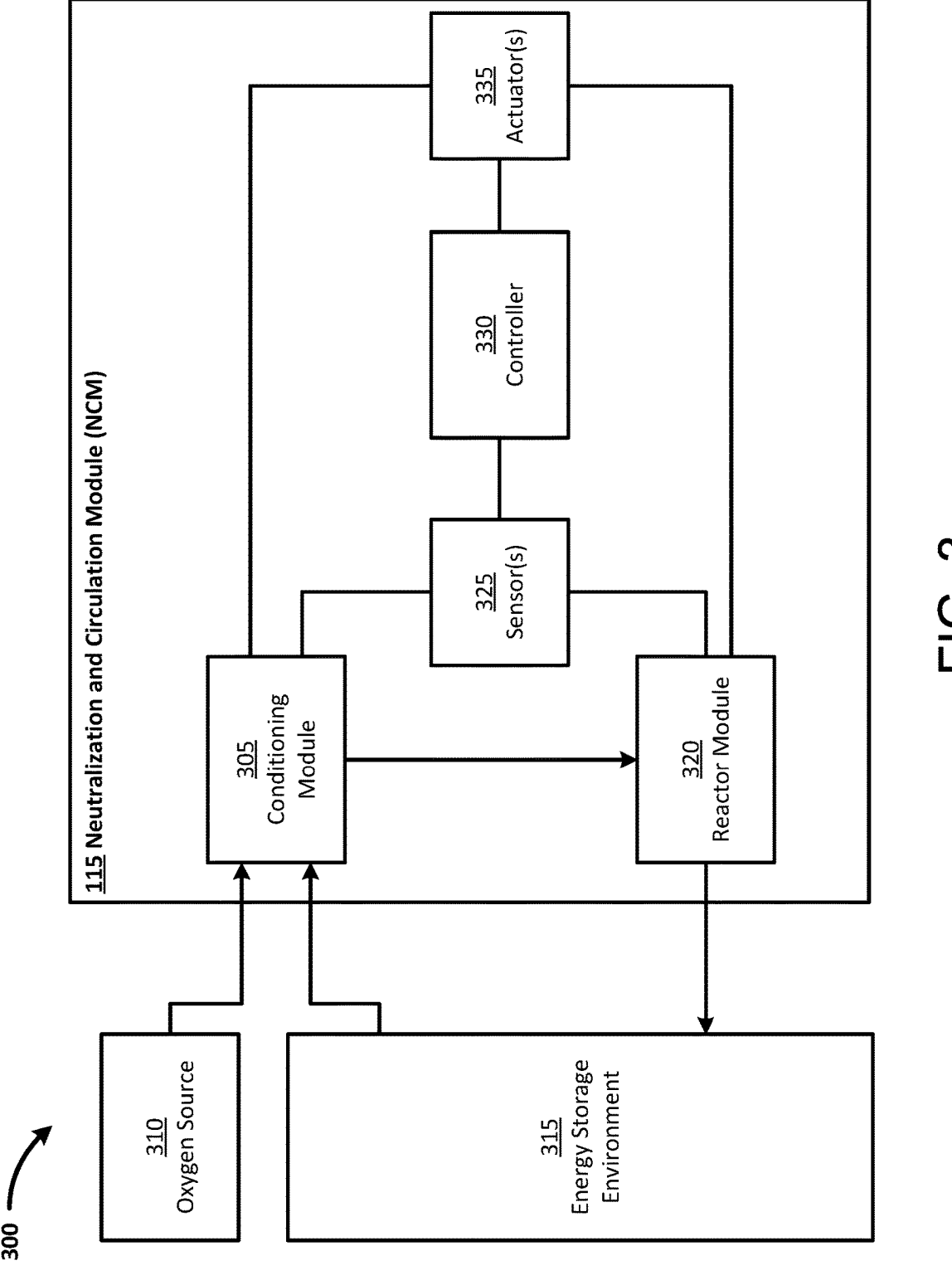
FIG. 3 depicts a block diagram of an exemplary NCM.

FIG. 3 depicts a block diagram of an exemplary NCM. In an exemplary system 300, the NCM 115 includes a conditioning module 305. The conditioning module 305 (controllably) receives an oxygen containing stream (e.g., Q2) from an oxygen source 310 (e.g., via the oxygen intake port 125). The conditioning module 305 further receives an intake stream (e.g., Q1) from an energy storage environment 315 (e.g., the chamber 111 via the intake port 120). The conditioning module 305 may, for example, selectively mix the oxygen containing stream with the intake stream based on at least one criterion (e.g., determined by an environment control profile (ECP)) to form a reaction input stream.

The conditioning module 305 is in fluid communication with a reactor module 320. The conditioning module 305 may provide the intake stream from the energy storage environment 315 to the reactor module 320. The conditioning module 305 may, for example, (selectively) mix the oxygen containing stream with the intake stream before it enters the reactor module to from the reaction input stream. The reactor module 320 may, for example, initiate a reaction in the reaction input stream to generate one or more inert species. The reactor module 320 may, for example, maintain a reaction in the reaction input stream to generate one or more inert species. The reactor module 320 may, for example, control a reaction in the reaction input stream to generate one or more inert species.

The one or more inert species are discharged from the reactor module 320 into the energy storage environment 315. For example, the one or more inert species may include combustion-suppressing species. In various embodiments, for example, the inert specie(s) may include nitrogen. In some embodiments, for example, the inert specie(s) may include carbon dioxide. In some embodiments the inert specie(s) may, for example, include water vapor. Accordingly, various embodiments may advantageously suppress flammability in the energy storage environment 315. Various embodiments may advantageously use toxic and/or combustible gases as feedstock to produce the combustion-suppressant stream.

The NCM 115 further includes a sensor module 325. The NCM 115 may, for example, include multiple sensor modules. As depicted, at least one sensor module 325 is operably coupled to a conditioning module 305. At least one sensor module 325 is operably coupled to the reactor module 320. A sensor module 325 may be configured to monitor at least one environmental parameter (e.g., temperature, humidity, pressure, flow rate, velocity). A sensor module 325 may be configured to monitor at least one composition parameter (e.g., presence of a species, concentration, partial pressure).

The sensor modules 325 are operably coupled to a controller 330. The controller 330 may, for example, be configured to receive signal(s) from the sensor module(s) 325. The controller 330 is further operably coupled to actuators 335. The controller 330 may, for example, operate the actuator(s) 335 according to at least one environment control profile (ECP).

An actuator 335 may, as depicted, be operably coupled to the conditioning module 305. An actuator 335 may, as depicted, be operably coupled to the reactor module 320. In some embodiments, an actuator may include a switch. An actuator may, for example, include a heater module. Various embodiments may have at least one actuator including a valve(s). For example, the controller 330 may operate an intake valve(s) actuator based on an ECP as a function of a sensor signal corresponding to stream composition (e.g., oxygen concentration). The controller 330 may, for example, operate a heater actuator based on an ECP as a function of a sensor signal corresponding to a thermal energy level (e.g., temperature).

Figure 4:
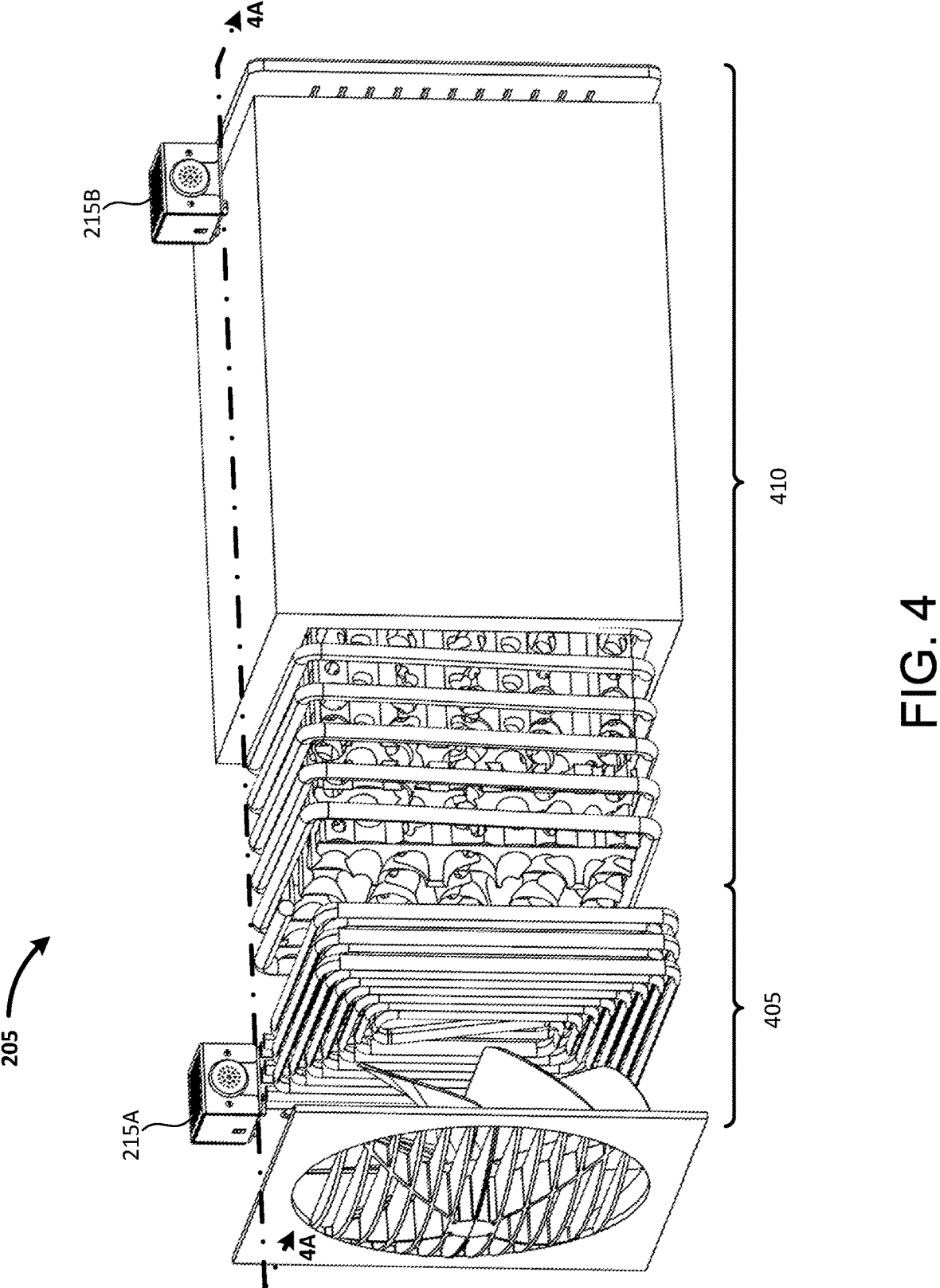
FIG. 4 depicts an exemplary view of an interior of the exemplary NCM.
Figure 5A:
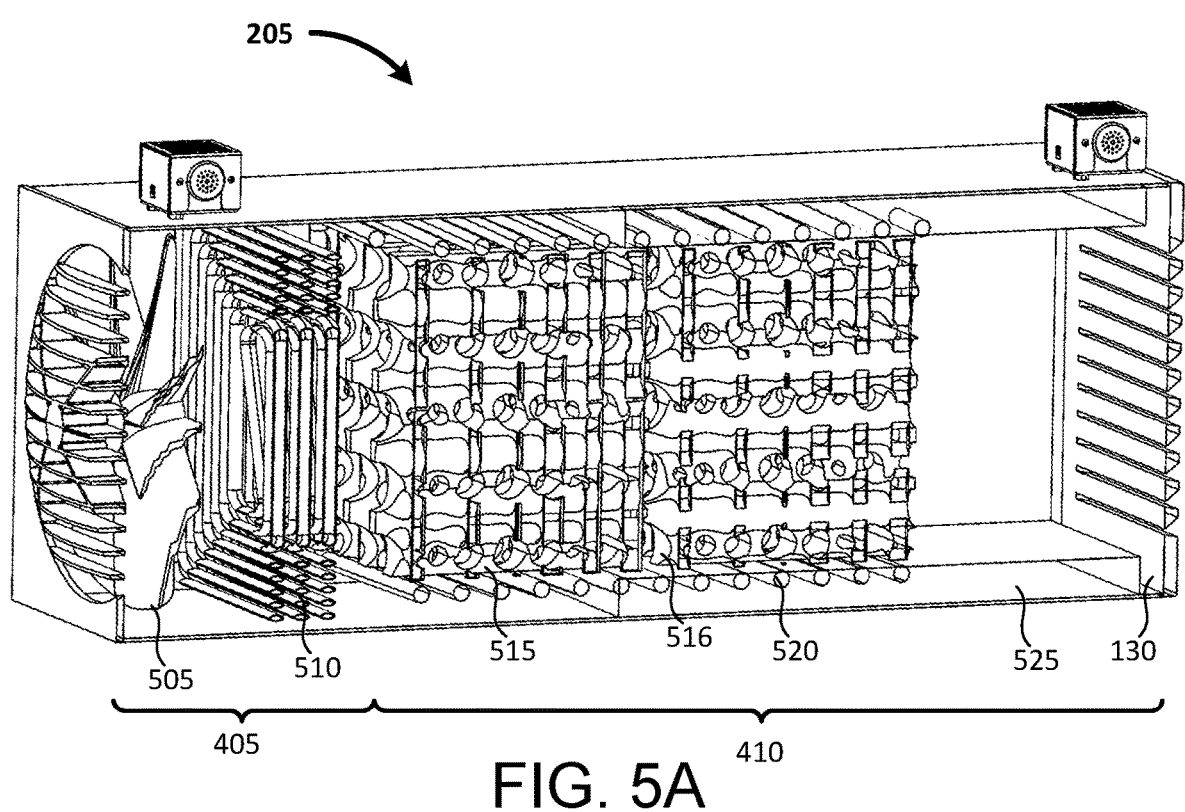
FIG. 5A depicts a cross-section of the interior of the exemplary NCM depicted in FIG. 4.
Figure 5B:
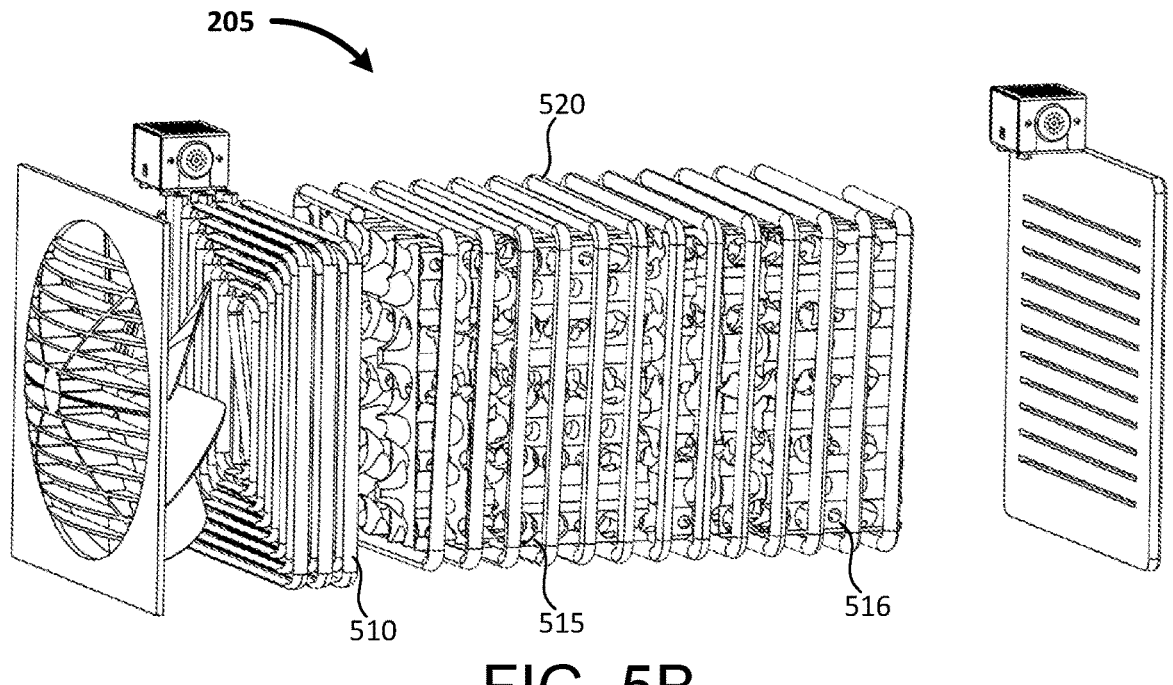
FIG. 5B depicts a perspective view of the interior of the exemplary NCM depicted in FIG. 4, with an insulation module hidden.

FIG. 4 depicts an exemplary view of an interior of the exemplary NCM. FIG. 5A depicts a cross-section of the interior of the exemplary NCM depicted in FIG. 4. FIG. 5B depicts a perspective view of the interior of the exemplary NCM depicted in FIG. 4, with an insulation module hidden.

As depicted, the reactor 205 includes a pre-reaction region 405 and a reaction region 410. As depicted, the pre-reaction region 405 includes a fan 505. The fan 505 may, for example, maintain a minimum flow $Q_{RI}$ into the reactor 205. For example, the fan 505 may be selectively operated by the controller 210 in response to a signal of the first sensor module 215A and/or the second sensor module 215B according to at least one criterion. The controller 210 may, for example, operate the fan 505 in response to a signal corresponding to flow rate. The controller 210 may, for example, operate the fan 505 in response to a signal corresponding to pressure. The at least one criterion may, for example, be defined by an ECP.

In some embodiments, the controller 210 may, for example, operate at least one actuator (e.g., the fan 505) in response to an external signal. For example, the controller 210 may operate one or more actuators in response to a signal(s) from a fire protection system. The controller 210 may, for example, operate one or more actuators in response to a signal(s) from at least one battery management system.

The pre-reaction region 405 further includes a heater module 510. The heater module 510 may, for example, be selectively operated by the controller 210 in response to a sensor signal(s). For example, the controller 210 may operate the heater module 510 in response to a temperature signal(s) (e.g., temperature below a predetermined minimum threshold corresponding to a desired reaction(s)). The temperature threshold(s) may, for example, be defined by an ECP.

The reaction region 410 includes a first reaction unit 515 and a second reaction unit 516. The reaction units may, for example, include at least one catalytic material. In some embodiments, the first reaction unit 515 may, for example, include a different catalytic material(s) than the second reaction unit 516. For example, the first reaction unit 515 and the second reaction unit 516 may be selected to operate synergistically. The first reaction unit 515 may, for example, be configured to receive an intake stream having target specie(s) and induce a first reaction (set) to generate a first output stream having a first composition profile. The second reaction unit 516 may be configured to receive the first output stream and induce a second reaction (set) to generate a second output stream having a second composition profile. The second composition profile may, for example, be (substantially) combustion suppressant.

In some embodiments, at least one of the first reaction unit 515 and the second reaction unit 516 may, for example, include at least one non-catalytic reaction mechanism. For example, a reaction unit may be adsorptive. A reaction unit may, for example, induce combustion (e.g., a combustion chamber) without a catalyst.

In the depicted example, the reaction region 410 includes a heater module 520. The heater module 520 may, for example, be a second heater module. The heater module 520 may be (selectively) operated to maintain a (predetermined) minimum thermal energy level within and/or on a surface of the first reaction unit 515 and the second reaction unit 516. In some embodiments a first minimum thermal energy level may be maintained with respect to the first reaction unit 515. A second minimum thermal energy level may be maintained with respect to the second reaction unit 516. The heater module 520 may, for example, be operated by the controller 210 in response to at least one sensor signal(s). The controller 210 may, for example, control the heater module 520 according to an ECP.

In some embodiments a cooling module(s) may, for example, be provided. The cooling module may, for example, be selectively operated (e.g., by the controller 210, in response to at least one sensor signal, according to an ECP) to maintain a (predetermined) maximum thermal energy level.

A distal portion of the reaction region 410 is surrounded by an insulation module 525. The insulation module 525 may, for example, be configured to limit thermal energy radiation and/or convection from the reactor 205. The insulation module 525 may advantageously assist in maintaining a (predetermined) minimum and/or maximum thermal energy level with respect to at least one reaction unit.

As depicted, a reaction input stream may enter the proximal end of the reactor 205 through the fan 505, pass through the heater module 510 (e.g., thereby being raised to a minimum temperature). The minimum temperature may, for example, correspond to a minimum thermal energy for an intended reaction mediated by the first reaction unit 515 and/or the second reaction unit 516. The (heated) reaction input stream may pass through the first reaction unit 515 and the second reaction unit 516 (e.g., impelled by the fan 505), thereby generating from at least one toxic and/or flammable species in the reaction input stream at least one combustion suppressant species. The combustion suppressant species may then be discharged from the reactor 205 through the output port 130.

Figure 6:
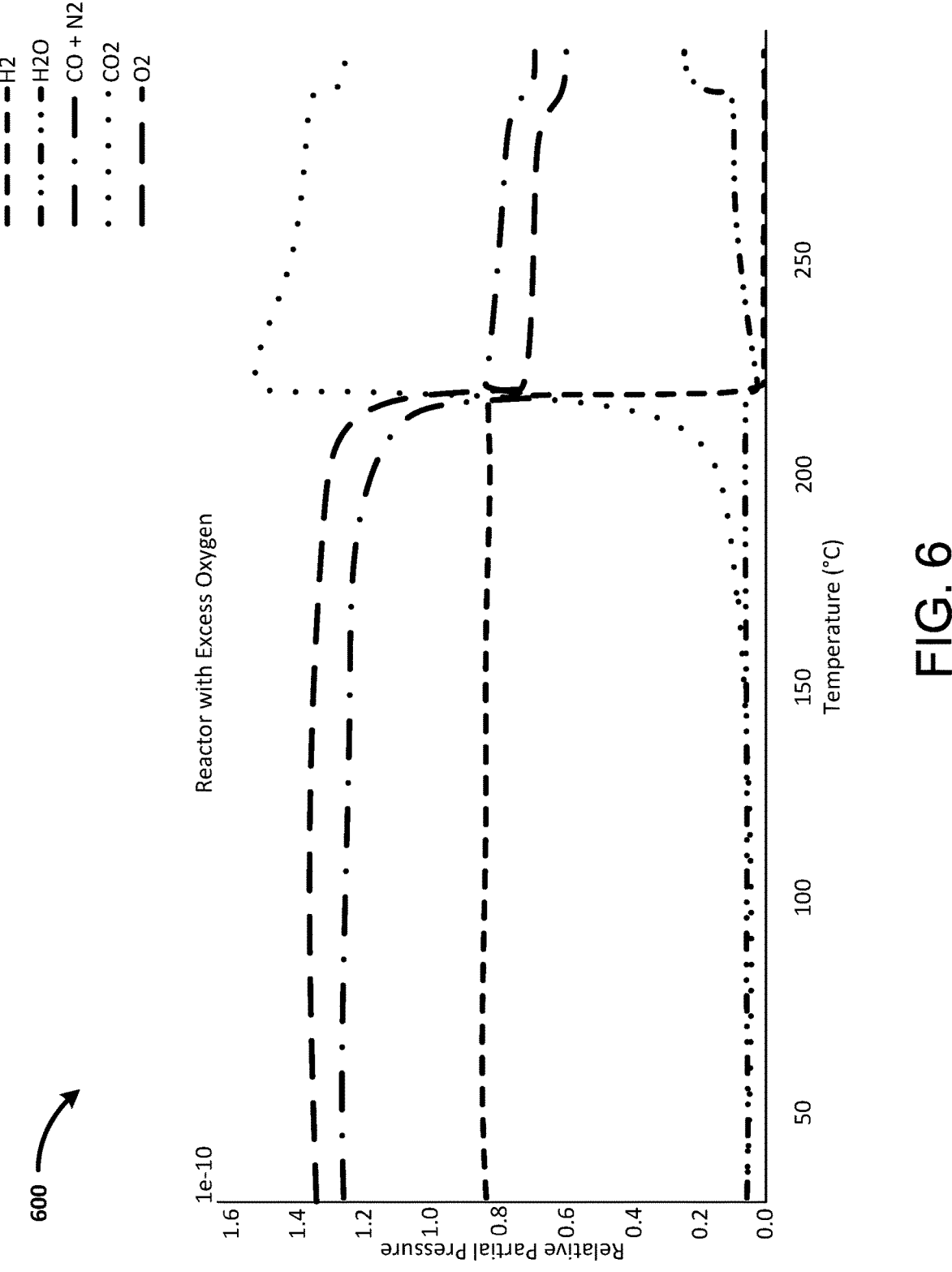
FIG. 6 depicts an exemplary plot of partial pressure over time of select components of a gaseous stream in an exemplary reactor.

FIG. 6 depicts an exemplary plot of partial pressure over time of select components of a gaseous stream in an exemplary reactor. The plot 600 depicts simulated species concentrations during a catalytic process that converts flammable gas species (e.g., in the intake stream Q1) including hydrogen and carbon monoxide to combustion-suppressant gas species (e.g., in the output stream Q2) including carbon dioxide and water vapor.

The plot 600 may, for example, depict the progress of a catalytic reaction. The plot 600 may, for example, depict the progress of oxidation. The chemical reaction (e.g., catalytic reaction, oxidation) may include a chemical process(es) implemented in at least one reaction unit (e.g., reactor 205, first reaction unit 515, second reaction unit 516). In various embodiments, at least one reaction unit may be configured to utilize porous-media combustion. Some embodiments may include at least one reaction unit configured to utilize lean-premixed combustion. Some embodiments may include at least one reaction unit configured to utilize common combustion process(es). Some embodiments may include at least one reaction unit configured to utilize (a series of) gas-phase reaction. In various embodiments, at least one reaction may be configured to utilize (a series of) surface reaction process(es).

Conversion efficiency may vary depending on environmental conditions such as, by way of example and not limitation, reactor temperature, inlet gas temperature, gas mixture concentration(s), humidity, pressure, or some combination thereof. In some embodiments at least one sensor may be configured to measure one or more environmental conditions. A controller(s) may, for example, be configured to operate various actuator(s) in response to signal(s) from the at least one sensor.

Figure 7:
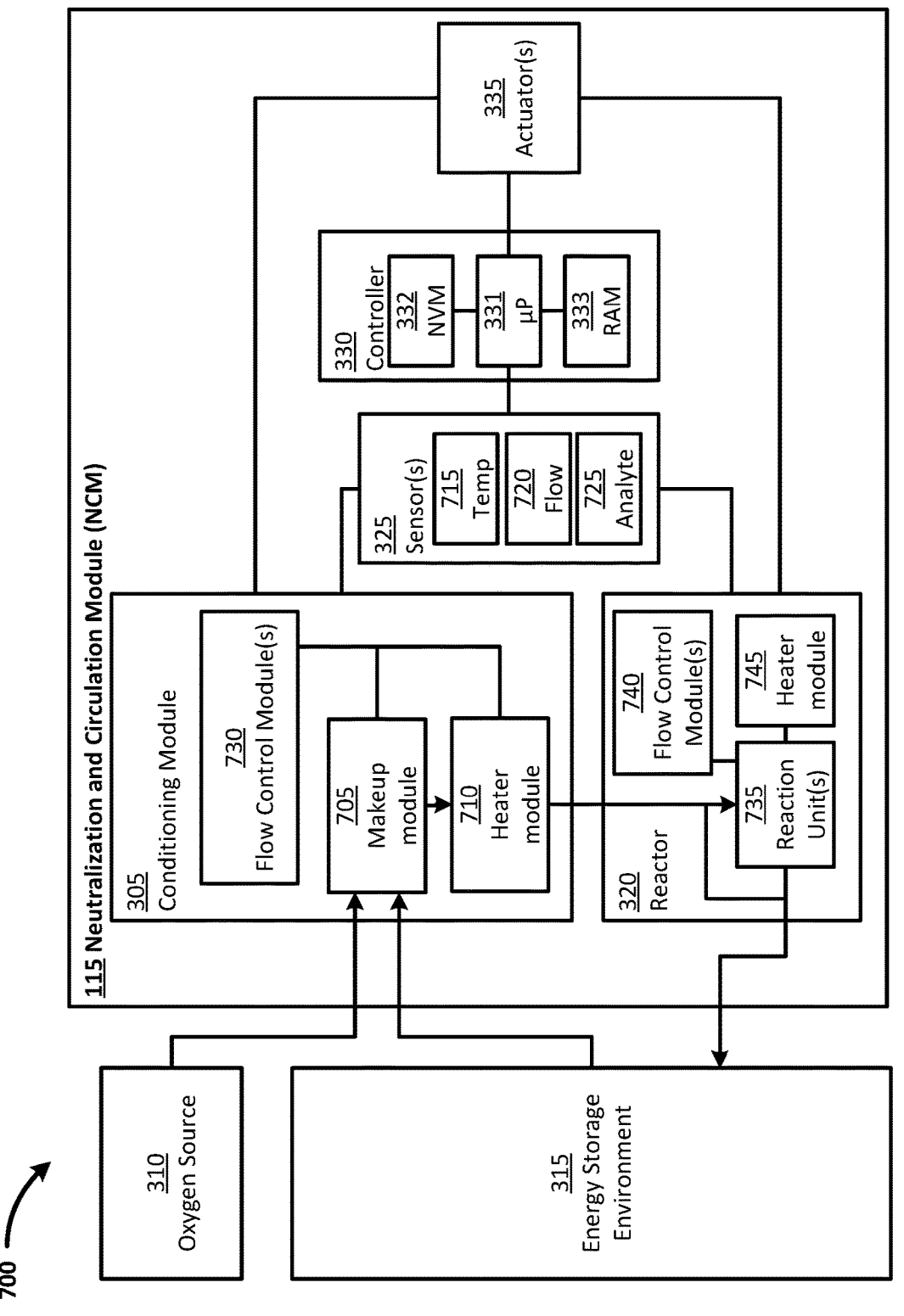
FIG. 7 depicts a block diagram of an exemplary NCM with a processor-based controller, output flow recirculation, a heater module, and a makeup module.

FIG. 7 depicts a block diagram of an exemplary NCM with a processor-based controller, output flow recirculation, a heater module, and a makeup module. In a system 700, the controller 330 includes a processor 331 (e.g., a microprocessor as depicted and labeled "μP"). In some embodiments, the processor 331 may, for example, include multiple processors. The processor 331 is operatively coupled to at least one nonvolatile memory module 332 (labeled "NVM") and at least one random access memory module 333 (labeled "RAM"). The nonvolatile memory module 332 may, for example, include at least one program of instructions that, when executed on the processor 331, cause neutralization and/or circulation operations to be performed by the NCM 115.

The conditioning module 305 includes a makeup module 705. The makeup module 705 is in fluid (intake) communication with the oxygen source 310 and the energy storage environment 315. The makeup module 705 is in fluid (output) communication with the reactor module 320 through a heater module 710.

The sensor module 325 includes a temperature sensor 715. The temperature sensor 715 may, for example, be configured to measure a temperature in the conditioning module 305 and/or the reactor module 320. For example, the temperature sensor 715 may generate a signal in response to a temperature of a gaseous stream entering, in, and/or exiting the heater module 710. In some embodiments the temperature sensor 715 may, for example, generate a signal (s) in response to a temperature of a reactor material.

The sensor module 325 includes a flow sensor 720. The flow sensor 720 may, for example, be configured to measure flow rate related to the conditioning module 305 and/or the reactor module 320. For example, the flow sensor 720 may generate a signal in response to a flow rate of a gaseous stream entering the makeup module 705. The flow sensor 720 may generate a signal in response to a flow rate of a gaseous stream entering the heater module 710. The flow sensor 720 may generate a signal in response to a flow rate of a gaseous stream entering the reactor module 320. The flow sensor 720 may generate a signal in response to a flow rate of a gaseous stream exiting the reactor module 320.

The sensor module 325 includes an analyte sensor 725. The analyte sensor 725 may, for example, be configured to measure composition of at least one gaseous stream. For example, the analyte sensor 725 may configured to measure a level of oxygen. The analyte sensor 725 may, for example, be configured to measure a concentration of toxic and/or flammable gas specie(s). The analyte sensor 725 may, for example, be configured to measure a concentration of combustion suppressant (e.g., inert) gas specie(s).

The conditioning module 305 includes a flow control module 730. The flow control module 730 is operatively coupled to the makeup module 705 and the heater module 710. For example, the flow control module 730 may control fluid communication in and/or through the makeup module 705 and/or the heater module 710. The flow control module 730 may, for example, be operably coupled (e.g., electrically, mechanically) to corresponding valves (e.g., selective flow control) in the makeup module 705 and/or the heater module 710. The controller 330 may operate the flow control module 730 via at least one actuator 335 to control at least one condition (e.g., flow rate, temperature) corresponding to the conditioning module 305.

Flow control module 730 may, for example, include at least one valve (e.g., operated by an actuator 335, such as a solenoid, rotary actuator, linear actuator, switch). The controller 330 may operate the flow control module 730 via the actuator(s) 335 based on an ECP (e.g., stored on the nonvolatile memory module 332) as a function of a signal(s) received from the sensor module 325. For example, the controller 330 may operate the flow control module 730 such that the makeup module 705 maintains a (predetermined) range of oxygen in the intake stream. The controller 330 may operate the flow control module 730 such that a dwell time of the intake stream in the heater module 710 maintains a predetermined temperature range as the intake stream enters the reactor module 320. The controller 330 may operate the flow control module 730 such that a predetermined minimum and/or maximum flow rate is maintained into the reactor module 320.

The reactor module 320 includes a reaction unit 735. The reactor module 320 may, for example, include multiple reaction units 735. As depicted, intake stream(s) (e.g., mixed with an oxygen-containing stream(s)) received from the conditioning module 305 enter the reaction unit 735. The reactor module 320 includes a flow control module 740. The flow control module 740 is operably coupled to the reaction unit 735. For example, the flow control module 740 may control the flow of at least one gaseous stream into, through, and/or from the reaction unit 735. The flow control module 740 may, for example, be operated by the controller 330 as discussed with reference to the flow control module 730.

The reaction unit 735 is operably coupled to a heater module 745 (e.g., heater module 510, first reaction unit 515, second reaction unit 516). The heater module 745 may, for example, be operated by the controller 330 (e.g., according to a signal from a temperature sensor 715) to maintain a predetermined minimum temperature in the reaction unit 735.

In the depicted example, at least a portion of an output stream of the reaction unit 735 is recirculated into an intake stream of the reaction unit 735. For example, a chemical reaction in the 735 may be exothermic. The output stream of the reaction unit 735 may have a higher temperature then an intake stream. A portion of the output stream may be recycled into the input stream to thermally condition the stream entering the reaction unit 735 (e.g., to achieve a predetermined minimum temperature, such as to induce and/or maintain a desired chemical reaction).

In some embodiments, heat conduits may, for example, redistribute thermal energy. For example, in the illustrative exothermic reaction example, a heat conduit (e.g., copper tubing, aluminum conduit) may collect heat from the output and conduct it to the input (e.g., to the heater module 745). In some embodiments, an external heat source (e.g., ESMs, such as chemical energy storage modules 105; solar thermal energy) may be harvested to provide (thermal) energy.

Figure 8:
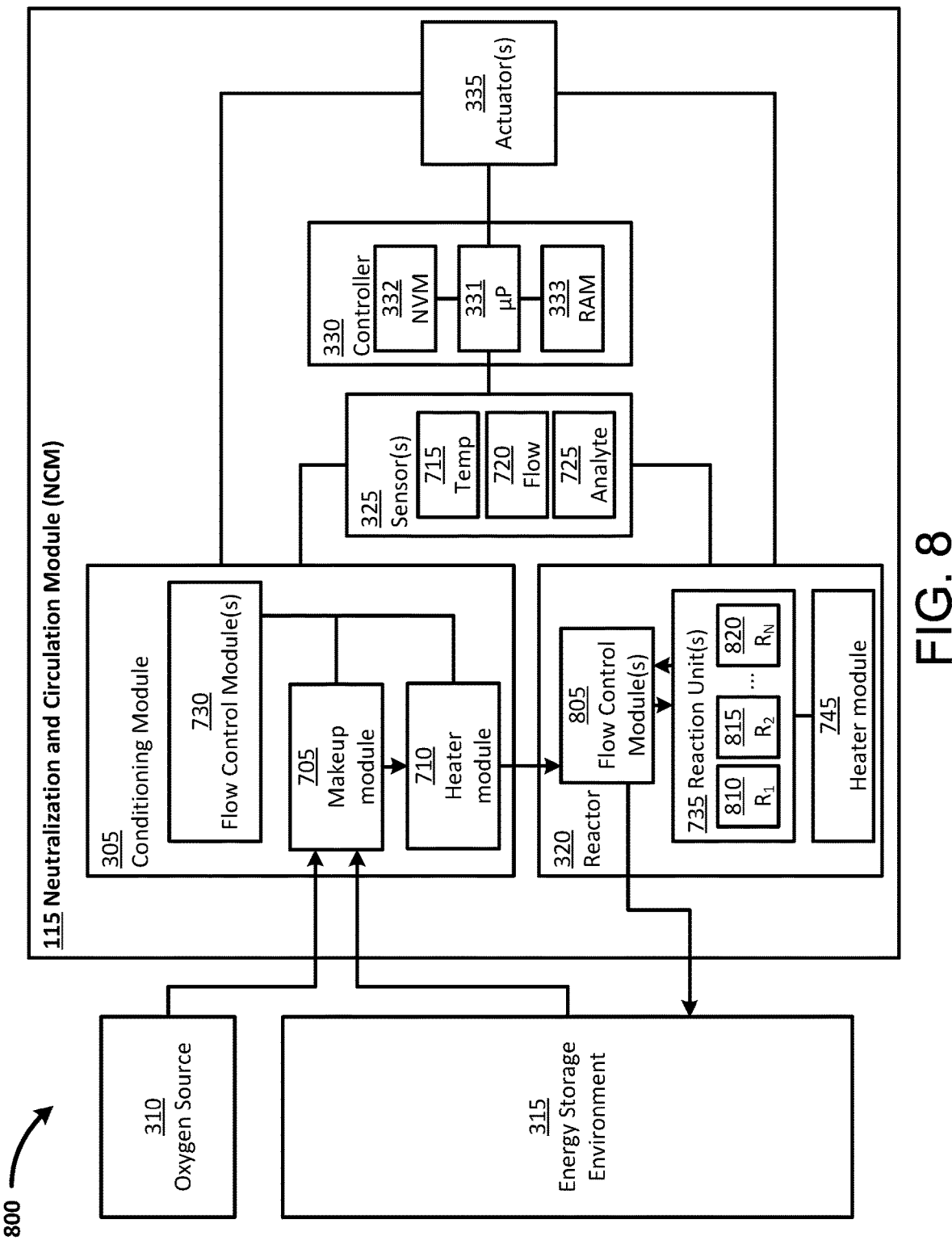
FIG. 8 depicts a block diagram of an exemplary NCM with a reactor having multiple reaction modules.

FIG. 8 depicts a block diagram of an exemplary NCM with a reactor having multiple reaction modules. In a system 800, the reactor module 320 includes a flow control module 805. The reaction unit 735 includes multiple reaction units. As depicted, the reaction unit 735 includes N reaction units (where N is a variable corresponding to a number of reaction units). The reaction unit 735 includes a first reaction unit 810 ($R_1$), a second reaction unit 815 ($R_2$), and an Nth reaction unit 820 ($R_N$).

The flow control module 805 may, for example, be individually in fluid communication with each unit $R_i$ (where i is an index variable corresponding to a currently selected one of the N reaction units) of the reaction unit 735. For example, the flow control module 805 may include a manifold. The manifold may, for example, be in fluid communication with each $R_i$ via at least one valve. The valve(s) may, for example, be selectively operated by the controller 330. The controller 330 may, for example, operate the valve(s) based on an ECP as a function of at least one sensor signal (e.g., flow rate, composition, temperature). Accordingly, a (dynamic) reaction sequence may be generated through the individual units of the reaction unit 735 by selective operation of the flow control module 805. The flow control module 805 may, for example, generate a dynamic reaction sequence in response to a current composition (e.g., species, concentration) of a stream (e.g., intake stream).

Figure 9:
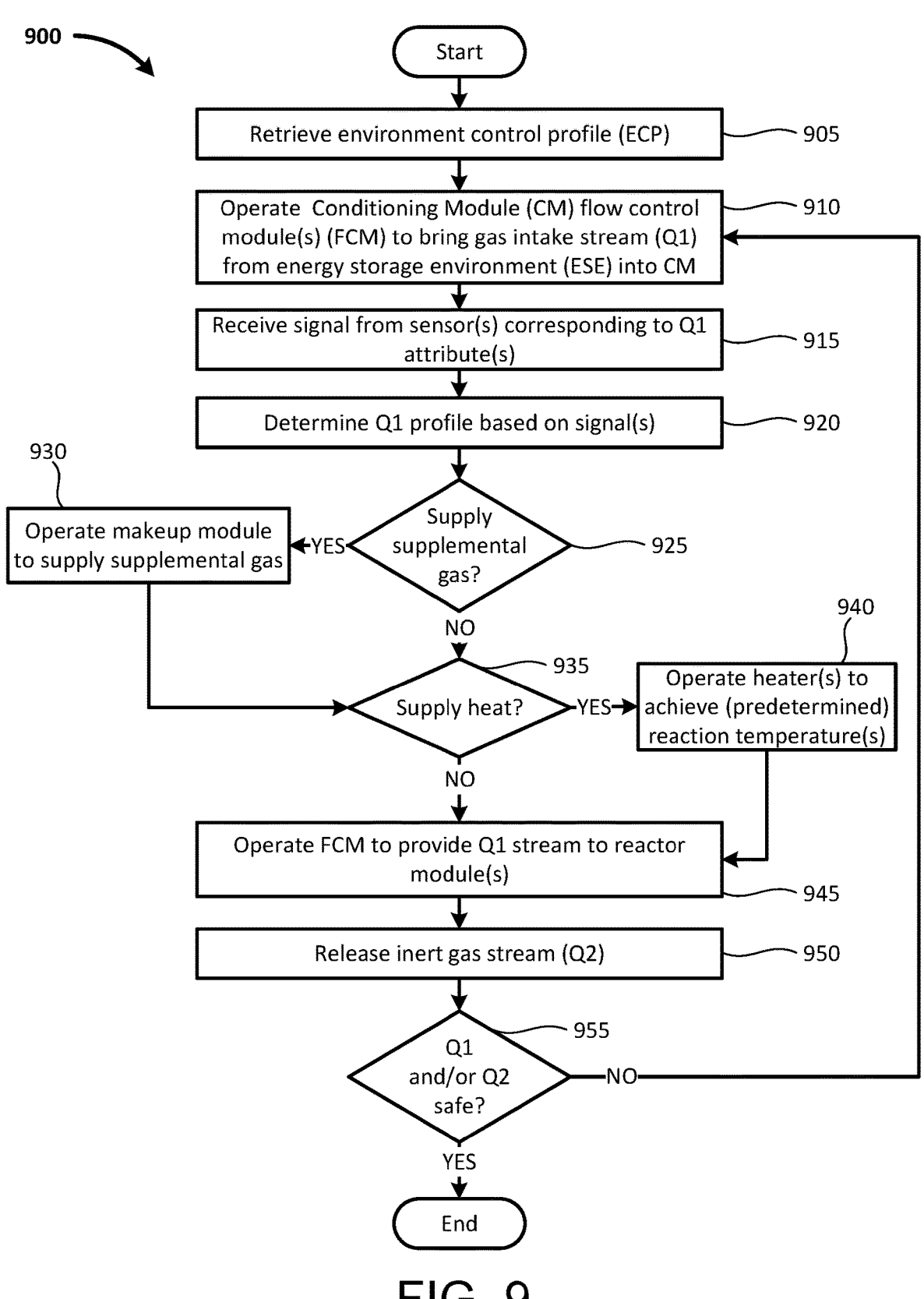
FIG. 9 depicts an exemplary method of operating an NCM.

FIG. 9 depicts an exemplary method of operating an NCM. In a method 900, and environment control profile (ECP) is retrieved in a step 905. The ECP may, for example, be retrieved from a nonvolatile memory module. The method 900 may, for example, be at least partially performed by at least one processor (e.g., of the controller 330). In a step 910, a flow control module(s) (e.g., flow control module 730) of a conditioning module (e.g., conditioning module 305) is operated to admit a gas intake stream Q1 (e.g., Q1 as disclosed at least with reference to FIG. 1) from an energy storage environment (e.g., chamber 111) into the conditioning module.

Signals received from at least one sensor in a step 915. The controller may, for example, read a sensor (e.g., actively query). The controller may, for example, passively receive a signal(s) from a sensor. In a step 920, a profile for the intake stream Q1 is determined based on the signal(s). The profile may, for example, include environmental attribute(s) (e.g., temperature, humidity, pressure, flow). The profile may, for example, include composition attributes (e.g., species, concentration).

Based on the ECP as a function of the Q1 profile, it is determined, in a decision point 925, whether to supply supplemental gas. The supplemental gas may, for example, include oxygen. A supplemental gas may, for example, be supplied as a component of a stream (e.g., oxygen containing stream Q2 as disclosed at least with reference to FIG. 1). If it is determined to supply supplemental gas in the decision point 925, then a makeup module (e.g., the makeup module 705) is operated to supply the supplemental gas(es) in a step 930.

Based on the ECP as a function of the Q1 profile, it is determined in a decision point 935 whether to supply heat. The heat may, for example, supplied by a heater module (e.g., heater module 710, heater module 745). If it is determined to supply heat, then the heater module(s) is operated in a step 940 to achieve a (predetermined) reaction temperature(s) (e.g., as defined by the ECP).

The FCM is further operated to provide the Q1 stream to a reactor module(s) in a step 945, and an inert gas stream Q2 (e.g., combustion suppressant stream) is discharged in a step 950. If it is determined, in a decision point 955 (e.g., based on sensor signal(s) corresponding to an appropriate stream (s) that Q1 and/or Q2 (e.g., as defined in an ECP) are safe, then the method 900 ends. The Q1 and/or Q2 may, for example, be determined to be safe within a (predetermined) safe criterion. The safe criterion may, for example, include a temperature range. The safe criterion may include a maximum concentration (e.g., of flammable and/or toxic species). The safe criterion may, for example, include a minimum concentration (e.g., of combustion suppressant species). In some embodiments the decision point 955 may determine whether an environment is safe based on the intake stream Q1 being received. In some embodiments the decision point 955 may determine whether an output stream Q2 is sufficiently neutralized and/or combustion suppressant.

If it is determined that Q1 and/or Q2 are not safe, then the method 900 returns to the step 910 and the steps 910-955 are repeated until the environment is determined to be safe in the decision point 955.

Figure 10:
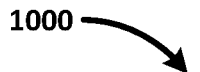
FIG. 10 depicts an exemplary method of operating an NCM with multiple reaction modules.
Figure 10:
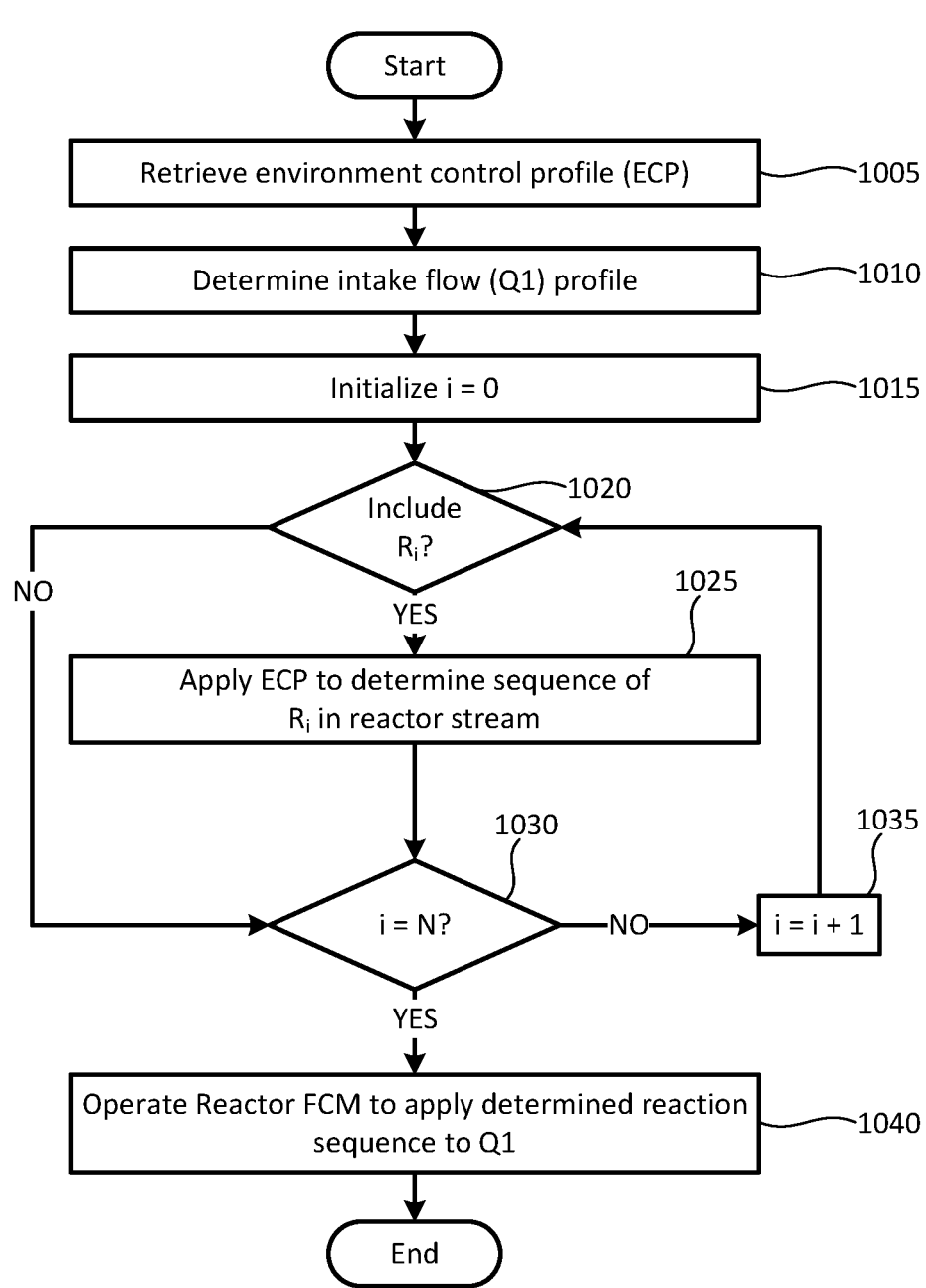

FIG. 10 depicts an exemplary method of operating an NCM with multiple reaction modules. In a method 1000, an ECP is retrieved in a step 1005. An intake flow Q1 profile is determined in a step 1010 (e.g., as disclosed at least with reference to FIG. 9). An index variable i is initialized (e.g., to zero, as depicted) in a step 1015. The method 1000 may, for example, be executed by at least one processor according to a program of instructions (e.g., retrieved from at least one NVM module).

In a decision point 1020, a selected reactor unit $R_i$ is determined whether to be included in a reaction sequence. The $R_i$ may, for example, be included or excluded based on the ECP as a function of the ECP. The decision may, for example, further be a function of attribute(s) of the $R_i$. Attribute(s) may, for example, include composition, associated reactants, associated products, association chemical reactions, or some combination thereof. In some embodiments, attribute(s) of the $R_i$ may, for example, be included in the ECP. The $R_i$ may, for example, include a reaction unit $R_i$ such as disclosed at least with reference to the reaction unit 735 (e.g., first reaction unit 810, second reaction unit 815, nth reaction unit 820) depicted in FIG. 8.

If the $R_i$ is determined to be included in the reaction sequence in the decision point 1020, then the ECP is (further) applied, in a step 1025, to determine a sequence of the $R_i$ in a reactor stream. The sequence may, for example, be stored (e.g., in a RAM and/or NVM module) associated with the $R_i$.

Once the sequence of the $R_i$ in the reactor stream is determined in the step 1025, or the $R_i$ is determined to not be included in the decision point 1020, then, if the index variable (i) is determined in a decision point 1030 to not have reached a variable N corresponding to a total number of reactor units to be considered, the index variable (i) is incremented in a step 1035 and the method 900 returns to the decision point 1020.

Once it is determined in the decision point 1030 that the index variable has reached N, then the reaction sequence is determined. At least one reactor FCM (e.g., flow control module 805) is operated, in a step 1040, to apply the determined reaction sequence to Q1. Accordingly, various embodiments may advantageously apply a dynamic reaction sequence such as, for example, in response to a composition of an intake stream.

Figure 11:
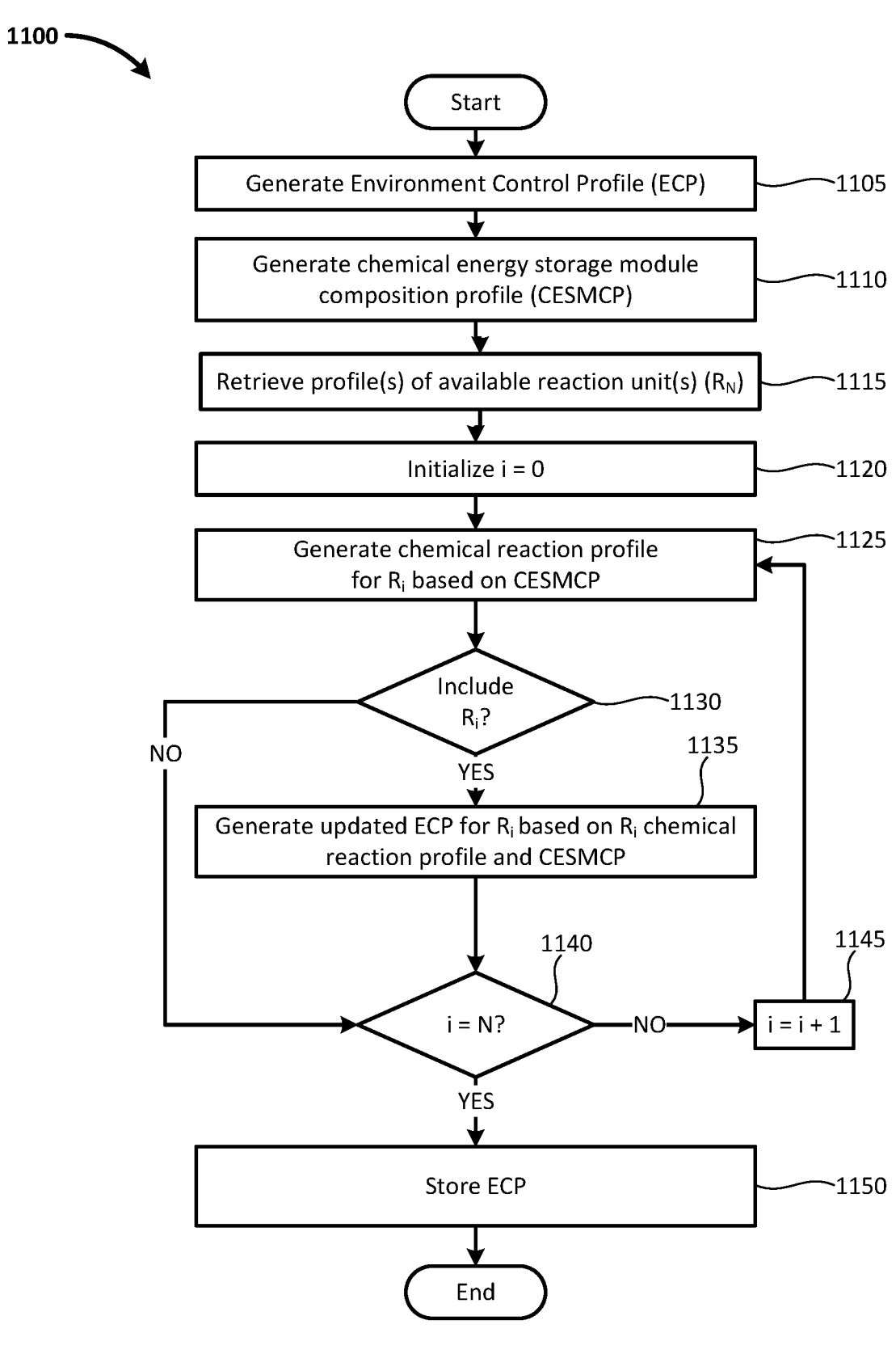
FIG. 11 depicts an exemplary method of generating an environment control profile.

FIG. 11 depicts an exemplary method of generating an environment control profile. In a depicted method 1100, an ECP is generated in a step 1105. The ECP may, for example, be generated according to a template. The ECP may, for example, be generated according to data supplied by a user (e.g., potential intake attributes, desired output attributes, component technical data, desired reactions). The ECP may, for example, be generated by retrieval of an existing ECP from a data store (e.g., an NVM). The depicted method 1100 may, for example, be performed by at least one processor executing instructions retrieved from at least one processor. For example, the depicted method 1100 may be executed by a controller (e.g., controller 210, controller 330). In some embodiments the depicted method 1100 may, for example, be executed by a computing device (e.g., computer, personal computing device, server) during a design and/or configuration operation. A resulting ECP may, for example, be generated. The ECP may, for example, be transmitted to and/or stored for later retrieval by a controller.

A chemical energy storage module composition profile (CESMCP) is generated in a step 1110. The CESMCP may, for example, include attributes related to energy storage module(s) in an environment in fluid communication with an NCM. The CESMCP may, for example, be generated in response to user input (e.g., battery composition, expected off gas species, target off gas species, expected temperatures). The CESMCP may, for example, be generated by retrieval of an existing CESMCP (e.g., from a data store).

Profiles of available reaction unit(s) ($R_N$) are retrieved (e.g., from at least one data store) in a step 1115. The profile(s) may, for example, include reaction attribute(s) (e.g., composition, reactant species, chemical reaction(s), product species) associated with each reaction unit ($R_i$). The available reaction unit(s) may, for example, be determined based on user input. The available reaction unit(s) may, for example, be predetermined based on an existing NCM configuration profile. The available reaction unit(s) may, for example, be determined based on at least one library of potential reaction unit(s) (e.g., from a manufacturer, from a user, from a vendor).

A counter variable (i) is initialized (e.g., to zero, as depicted) in a step 1120. A chemical reaction profile is generated for each $R_i$ based on the associated reaction unit profile and the CESMCP in a step 1125. For example, a chemical reaction profile may be generated by matching species in the CESMCP with reactants in the reaction unit profile. In some embodiments the chemical reaction profile may be a function of products of other chemical reaction profile(s). In some embodiments, the chemical reaction profile may, for example, include reaction temperature(s) and/or reaction temperature range(s). In some embodiments the chemical reaction profile may include, by way of example and not limitation, composition attributes (e.g., reactant:product ratios, flow rates per unit reaction unit, concentration thresholds, concentration ranges). In some embodiments the CESMCP may, for example, be automatically generated (e.g., by a simulation engine(s)). In some embodiments the CESMCP may, for example, be generated based on user input (e.g., configuring parameter(s) of the $R_i$ corresponding to the CESMCP).

Based on the chemical reaction profile, the depicted method 1100 includes, in a decision point 1130, determining whether $R_i$ is to be included in the ECP. For example, the determination may be made as function of the CESMCP and/or the chemical reaction profile. For example, if the chemical reaction profile is not associated with a desired reactant and/or product, the $R_i$ may be excluded from the ECP. In some embodiments the $R_i$ may be included if the chemical reaction profile is associated with neutralizing a potential component of the CESMCP (e.g., in conditions associated with the CESMCP and/or the ECP). The $R_i$ may, for example, be included if the chemical reaction profile is associated with generating a desired combustion suppressant species (e.g., based on the CESMCP and/or other chemical reaction profiles such as products and/or reactants associated therewith).

If the reaction unit $R_i$ is determined to be included in the decision point 1130, then an updated ECP is generated in a step 1135. The updated ECP includes the $R_i$ based on the corresponding chemical reaction profile and the CESMCP. For example, the ECP may include reactants and/or products associated with the $R_i$. In some embodiments the ECP may include, for example, operating conditions associated with the $R_i$ (e.g., temperature criterion(s), flow rate criterion(s)). In some embodiments an ECP may include multiple ECPs (e.g., one for each $R_i$). For example, some embodiments may include nested and/or hierarchical (e.g., cascading) ECPs. In some embodiments a single ECP may be generated.

Once the updated ECP is generated in the step 1135, or it is determined in the decision point 1130 that the $R_i$ is not to be included, then the depicted method 1100 proceeds to determining, in a decision point 1140, whether all the selected reaction units have been determined (the counter variable i equals the number of selected reaction units N). If no, then the index variable (i) is incremented in a step 1145 and the depicted method 1100 returns to the step 1125. If yes, then ECP is stored (e.g., in a data store) in a step 1150. The ECP may, for example, be transmitted to an NCM (e.g., stored in a data store such as the nonvolatile memory module 332). The depicted method 1100 ends.

Although various embodiments have been described with reference to the figures, other embodiments are possible. For example, although an exemplary system(s) has been described with reference to the figures, other implementations may be deployed in other industrial, scientific, medical, commercial, and/or residential applications.

In the exemplary scenario 100, a single NCM 115 is provided, and the NCM 115 has a single intake port 120, a single oxygen intake port 125, and a single output port 130. In some embodiments a single environment (e.g., container, building, room, unit) may, for example, be provided with multiple NCMs. For example, each chemical energy storage module may be provided with a dedicated NCM. In some embodiments each N energy storage modules may be provided with an NCM (where N may, for example, be a predetermined number of modules). N may, for example, be determined based on attributes of the NCM and/or energy storage module(s). In some embodiments a single NCM may, for example, operate across multiple chambers (e.g., multiple container 110).

In some embodiments each NCM may, for example, have a corresponding controller. In some embodiments a controller may, for example, include a communication module(s). The communication module(s) may, for example, be configured for wired (e.g., USB, ethernet, serial) communication. In some embodiments the communication module(s) may, for example, be configured for wireless (e.g., Wi-Fi, near-field communication such as Bluetooth, cellular such as GSM, CMDA, LTE) communication. The NCM controller may, for example, communicate between NCMs (e.g., across a distributed network such as in a single environment, across multiple environments). The NCM controller may, for example, communicate to a remote device (e.g., remote server). Data (e.g., status data) may, for example, be transmitted to the remote device. Command(s) and/or configuration(s) (e.g., ECP) may, for example, be transmitted to the NCM controller from the remote device. In some embodiments a single controller may operate multiple NCMs.

In various embodiments an NCM may, for example, be provided with multiple intake ports. The quantity and/or position of the intake ports may, for example, be determined based on energy storage module chemistry, energy storage module location, area and/or volume per intake port, capacity of a corresponding NCM, or some combination thereof. In some embodiments each N energy storage modules may be provided with an intake port.

In various embodiments an NCM may, for example, be provided with multiple oxygen containing stream intakes. Some embodiments may provide one or more sources of oxygen-rich gas. For example, some embodiments may include a source of concentrated oxygen (e.g., compressed oxygen). Some embodiments may, for example, include an oxygen generator. Some embodiments may, for example, include an oxidizing agent source other than oxygen. Some embodiments may, for example, include a non-gaseous (e.g., liquid, solid) oxidizing agent. In some embodiments, for example, a non-gaseous compound which may be rapidly activated (e.g., induce a chemical reaction) to generate a gaseous oxidation agent (e.g., oxygen). In some embodiments, multiple intakes may be provided for a single oxygen source. In some embodiments multiple sources may be in (selective) communication with a single intake. Some embodiments may provide at least one intake for each of multiple oxygen sources.

In some embodiments an NCM may be disposed entirely outside of a chamber (e.g., chamber 111). For example, the NCM may be mechanically mounted to an external surface (s) of a container (e.g., the container 110, a building). In some embodiments the NCM may be at least partially disposed within a chamber containing energy storage modules. In some embodiments the NCM may be disposed entirely within a chamber.

Various embodiments may, for example, include ports (e.g., intake, output) in various configurations (e.g., including location, orientation). In some embodiments, port(s) may be placed in a floor. Port(s) may, for example, be placed in a wall(s). Some embodiments may, for example, have depending port(s) in fluid communication with the NCM via conduits (e.g., rigid ducts, flexible ducts). In some embodiments ports may, for example, be placed and oriented such that intake and/or output increases circulation in an environment (e.g., in the chamber 111). For example, the intake and output ports may be spaced apart and/or oriented relative to one another such that circulation is induced to urge un-neutralized gas into the intake port(s).

In some embodiments an intake port and/or output port may be in releasable fluid communication with a chamber containing chemical energy storage module(s). For example, an NCM may be configured as a portable unit. Such embodiments may, for example, be freestanding. Some embodiments may, for example, be releasably couplable to a container (e.g., magnetic, hook(s)).

Various embodiments may, for example, be configured as emergency response NCMs. Such embodiments may, for example, be rapidly deployable to an energy storage module (ESM) environment. For example, the NCM may be carried (e.g., wheeled, carried, slid, trailered) to an environment. The NCM may be deployed, for example, outside the ESM environment (e.g., outside of a container such as the container 110). At least one intake port and at least one intake port may be operated into fluid communication with the ESM. In some embodiments the intake and output port(s) may be independently coupled. In some embodiments the intake and output port(s) may be configured as distinct lumens within a single structure (e.g., flexible tube).

Some embodiments may, for example, be configured to couple to existing port(s) in the container (e.g., building vents, existing vents in a portable energy storage system container). Some embodiments may, for example, be configured to engage a surface (e.g., suction, magnetic, friction, piercing, screwing) of the container. Such embodiments may, for example, be configured to force fluid communication with the interior (e.g., piercing, screwing). Some embodiments may, for example, be configured to fluidly seal to a doorway(s) (e.g., by a fabric and/or polymeric 'boot' and/or curtain) such that the doorway may be operated open in a combustion suppressant environment.

In various embodiments, at least some component(s) of an NCM may, for example, be in fluid communication with an existing ducting and/or air flow system. For example, the reactor may be in fluid communication with a heating, ventilation, and/or air condition (HVAC) system (e.g., for a container, for a building). The reactor may, for example, be in selective communication with the HVAC system. A controller (e.g., NCM controller; external controller such as a battery management system, building management system) may, for example, selectively operate at least some portion of the HVAC system into fluid communication with the reactor (e.g., via an intake port). The (portion of the) HVAC system may, for example, be shunted from an air handling unit (e.g., air conditioner) to the reactor when one or more criteria are met (e.g., temperature, composition). In some embodiments the (portion of the) HVAC system may, for example, be operated such that the intake stream is shunted through the reactor before and/or after an air handling unit(s). Accordingly, various embodiments may advantageously integrate with an HVAC system to generate and/or maintain a non-flammable and/or non-toxic environment (e.g., when toxic and/or combustive gases are generated).

In some embodiments a reactor may, for example, be modular. For example, the reactor may be configured to receive multiple reaction units. A user may, for example, replace one or more of the reaction units. The reaction units may, for example, be placed in a predetermined sequence in the reactor such that the intake stream proceeds through the reaction units according to the predetermined sequence. The reaction unit(s) used in the reactor and/or the sequence of the reaction units may, for example, be determined (e.g., by a (chemical) process designer) according to (expected) conditions. The conditions may, for example, include expected off-gas composition and/or thermal conditions related to chemical ESMs in the environment.

The reactor may, for example, include a porous media substrate coated in catalytic material. The catalytic material may, for example, promote oxidation of at least one income flammable and/or toxic gas species. The catalytic material may, for example, promote reaction of at least one income flammable and/or toxic gas species into a non-flammable and/or non-toxic specie(s). The catalytic material may, for example, promote neutralization of at least one income flammable and/or toxic gas species into a non-flammable and/or non-toxic specie(s). The catalytic material may, for example, promote conversion of at least one income flammable and/or toxic gas species. The catalytic material may, for example, promote adsorption of at least one income flammable and/or toxic gas species. Accordingly, various embodiments may advantageously allow a reactor to be reconfigured based on a current and/or expected environment.

In various embodiments the porous media substrate may include, by way of example and not limitation, ceramic. For example, the substrate may include ceramic monoliths; ceramic foams; pellets made of alumina, zirconia, and/or other suitable ceramic; or some combination thereof. Some embodiments may, for example, include metallic foams.

In various embodiments a catalytic material may, for example, include noble metal catalysts. Noble metal catalysts may include, by way of example and not limitation, platinum, gold, silver, palladium, or some combination thereof.

Some embodiments may include catalytic material having non-noble metallic element(s). Non-noble metallic elements may, by way of example and not limitation, include iron, nickel, chrome, copper, manganese, oxides of such elements, metal organic frameworks (MOFs), or some combination thereof.

In some embodiments, catalytic material may include carbon-based material. Carbon-based material may include, by way of example and not limitation, carbon nanostructures, allotropes, composites, foams, monoliths, graphene, graphite, other carbon-containing material, other functionally enhanced carbon material, or some combination thereof.

In various embodiments a reaction module may be configured to induce combustion. For example, a reaction unit may include an enclosed can, annular, can-annular, porous media combustor, other chamber type configured to process a (continuous) stream of incoming gases. In various embodiments a reactor may include at least one reaction induction module (RIM). The RIM may, for example, include a heater. A heater may, for example, include an instantaneous heater (e.g., piezo-electric spark source, spark plug, explosive ignitor, flame). The RIM may, for example, be (selectively) operated to induce a (desired) reaction. For example, the RIM may be operated to initiate at least one reaction neutralizing a toxic and/or flammable specie(s) and/or generating at least one combustion-suppressant specie(s).

A reactor may, for example, include at least one ignition system configured to ignite and/or activate at least one corresponding reaction unit. For example, in some embodiments having a catalytic type reaction unit(s), active heaters may be used to heat the catalytic material to reach a minimum temperature and/or light-off temperature for activation. The light-off temperature may, for example, vary depending upon the catalyst material and/or concentration of hazardous gas species in the incoming stream. In various embodiments, light-off temperature may, for example, be between 15° C. to 500° C.

In some embodiments, a heating module(s) may heat reactor material and/or an incoming stream(s). The heating module may, for example, include gas heaters. In some embodiments a heating module may include resistive heating elements, heater coils, or some combination thereof. Some embodiments may include heating module(s) utilizing solid propellant. In some embodiments heating module(s) may include heat pipes and/or radiative heaters. Heating elements may, for example, surround and/or be located inside an inlet(s) and/or reaction unit(s). In some embodiments, heat from exothermic reactions in the reactor may be used to maintain minimum temperatures required to activate a catalyst material and/or pre-heat gases in an inlet and/or reactor. In embodiments including at least one reaction unit of a gas-phase combustor type, an ignition system(s) may be used to ignite an incoming gas flow(s). Ignition systems may include, but are not limited to, piezo-electric, spark, electric arc, or some combination thereof. Some ignition system(s) may, for example, utilize chemical and/or solid propellant. In some embodiments a pilot flame and/or hot-surface method(s) may be utilized.

Various embodiments may, for example, include hetero- and/or homogeneous absorbent, absorbent-coated, absorbent-impregnated substrates, or some combination thereof. Such reaction unit(s) may include, by way of example and not limitation, nickel. Some such reaction units may, for example, include noble metals. Some reaction units may, for example, include non-noble metals. Reaction units in some embodiments may, for example, include metal oxides, metal alloys, or some combination thereof. Some reaction units may utilize MOFs. Various embodiments may utilize zeolites. Some embodiments may, by way of example and not limitation, include reaction units having amorphous carbon, activated carbon, carbon allotropes, carbon containing materials that adsorb hazardous gas species, or some combination thereof.

In some embodiments temperature sensors (e.g., thermocouple, infrared, optical temperature sensor, resistance temperature detectors, thermistors semiconductor-based integrated temperature sensing circuits) may be located, by way of example and not limitation, in the inlet, reactor, and outlet to monitor thermal characteristics of the system. Measurement signals from the sensors may, for example, transmitted to and received by a controller. The controller may, for example, control activation, operation, and/or status of the heater system(s) in response to signal(s) received from the temperature sensor(s).

In various embodiments a sensor (e.g., first sensor module 215A, second sensor module 215B, sensor module 325) may include gas sensing elements (e.g., analyte sensor 725). In various embodiments gas sensing elements may include, by way of example and not limitation, pellistor sensing, catalytic bead-based sensing, or some combination thereof. Some embodiments may, for example, include infrared (IR) based sensors (e.g., non-dispersive IR, Fourier-transform IR sensing). Some embodiments may, for example, include thermal conductivity measurement sensing elements. In some embodiments, sensors may be configured to detect diffusion and/or separation of molecules through a lattice structure and/or porous media. Some embodiments may include at least one piezo-electric sensing element.

In some embodiments a controller may, for example, compare (estimated) species concentrations (e.g., based on sensor signal(s)) to at least one (predetermined) flammability limit (FL). Some embodiments may, for example, compare (estimated) species concentrations to at least one (predetermined) permissible exposure limit (PEL). A controller(s) may, for example, operate one or more actuators in response to the comparison. For example, an NCM may be activated based on a concentration approaching a (predetermined) threshold corresponding to a predetermined limit (e.g., PEL, FL). Flow rate (e.g., via fan speed, pump rate, valve configuration) may, for example, be controlled based on a relationship between a (estimated) concentration(s) and a corresponding predetermined limit.

In various embodiments initial reactants may include, by way of example and not limitation, various flammable hydrocarbon gas species. For example, hydrocarbon gas species may include methane, ethylene, volatile organic compounds (VOCs), or some combination thereof. The flammable gas species may, for example, be released from various battery chemistries. Some embodiments may, for example, be configured to receive initial reactants generated by one or more lithium-based battery cell chemistries. For example, some embodiments may be configured for lithium-ion battery chemistry. Some embodiments may, for example, be configured for lithium polymer battery chemistry. Some embodiments may, for example, be configured for lithium iron phosphate chemistry. Some embodiments may be configured for lithium metal chemistry. Some embodiments may be configured for nickel-metal hydride chemistry. Some embodiments may be configured for nickel cadmium chemistry.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an exemplary aspect, a neutralization and circulation module (NCM) may include an intake port and an output port, each in fluid communication with a chamber that substantially encloses a system of lithium-based chemical energy storage units capable of emitting combustible gases into the chamber. The NCM may include a reactor in fluid communication between the intake port and the output port. The reactor may include a catalyst. The reactor may be in controlled communication with an oxygen source such that the reactor, in response to receiving an intake stream via the intake port, selectively applies an oxygen-containing stream from the oxygen source to the intake stream to neutralize the combustible gases and generate a combustion suppressant gas stream that is discharged through the output port into the chamber such that an upper flammability limit approaches a lower flammability limit in the chamber.

The combustion suppressant gas stream may be discharged such that the upper flammability limit and the lower flammability limit intersect.

The NCM may include at least one sensor configured to generate at least one signal may correspond to at least one attribute of the reactor. The NCM may include at least one actuator corresponding to the reactor. The NCM may include a controller in operable communication with the at least one sensor and the at least one actuator, wherein the controller is configured to operate the at least one actuator in response to the at least one signal.

The at least one sensor may include a temperature sensor. The at least one attribute may include a thermal energy level in the reactor. The at least one actuator may include an actuator configured to selectively operate a heating element. The controller may be configured to operate the heating element such that a minimum thermal energy level is maintained in at least a portion of the reactor.

The at least one sensor may include an analyte sensor. The at least one attribute may include a composition of the intake stream. The at least one actuator may include an actuator configured to selectively operate a valve controlling a flow rate of the oxygen-containing stream. The controller may be configured to operate the valve such that a minimum oxygen level is maintained in the reactor.

The controller may be further configured to operate the valve such that a maximum oxygen level is maintained in the reactor.

The least one sensor may be configured to generate at least one signal in response to a presence of at least one chemical component in the intake stream. A controller may be operably coupled to the at least one sensor. The reactor may include a plurality of reactor modules. Each reactor module may be configured to initiate at least one reaction. The controller may be configured to control the selective fluid communication of the intake stream with the plurality of reactor modules in response to the at least one signal.

In an illustrative aspect, a neutralization and circulation module (NCM) may include an intake port and an output port. Each may be in fluid communication with a chamber that substantially encloses a system of chemical energy storage units capable of emitting combustible gases into the chamber. The NCM may include a reactor in fluid communication between the intake port and the output port. The reactor may be further in controlled communication with an oxygen source such that the reactor, in response to receiving an intake stream via the intake port, selectively applies an oxygen-containing stream from the oxygen source to the intake stream to neutralize the combustible gases and generate a combustion suppressant gas stream that is discharged through the output port into the chamber such that an upper flammability limit approaches a lower flammability limit in the chamber.

The combustion suppressant gas stream may be discharged such that the upper flammability limit and the lower flammability limit intersect.

The chemical energy storage units may be further capable of emitting toxic gases into the chamber. Neutralize the combustible gases may further include neutralize the toxic gases.

The oxygen-containing stream may include ambient air external to the chamber.

The chemical energy storage units may be lithium-based.

The NCM may include at least one sensor configured to generate at least one signal corresponding to at least one attribute of the reactor. The NCM may include at least one actuator corresponding to the reactor. The NCM may include a controller in operable communication with the at least one sensor and the at least one actuator. The controller may be configured to operate the at least one actuator in response to the at least one signal.

The at least one sensor may include a temperature sensor. The at least one attribute may include a thermal energy level in the reactor. The at least one actuator may include an actuator configured to selectively operate a heating element. The controller may be configured to operate the heating element such that a minimum thermal energy level is maintained in at least a portion of the reactor.

The at least one sensor may include an analyte sensor. The at least one attribute may include a composition of the intake stream. The at least one actuator may include an actuator configured to selectively operate a valve controlling a flow rate of the oxygen-containing stream. The controller may be configured to operate the valve such that a minimum oxygen level is maintained in the reactor. The controller may be configured to operate the valve such that a maximum oxygen level is maintained in the reactor.

The reactor may include a plurality of reactor modules. Each reactor module may be configured to initiate at least one reaction. The intake stream may be in selective fluid communication with the plurality of reactor modules. The NCM may include at least one sensor configured to generate at least one signal in response to a presence of at least one chemical component in the intake stream. The NCM may include a controller operably coupled to the at least one sensor and configured to control the selective fluid communication of the intake stream with the plurality of reactor modules in response to the at least one signal.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A neutralization and circulation module comprising:
an intake port and an output port, each in fluid communication with a chamber that substantially encloses a system of lithium-based chemical energy storage units configured to emit combustible gases into the chamber;
a reactor, the reactor in fluid communication between the intake port and the output port, the reactor comprising a catalyst and being further in controlled communication with an oxygen source;
at least one actuator; and
a controller in operable communication with the at least one actuator, wherein:
the controller is configured to operate the at least one actuator in response to at least one signal corresponding to at least one attribute of the reactor, such that the reactor, in response to receiving an intake stream from the chamber via the intake port, selectively applies an oxygen-containing stream from the oxygen source to the intake stream to neutralize the combustible gases and generate a combustion suppressant gas stream that is discharged through the output port into the chamber enclosing the system of lithium-based chemical energy storage units such that an upper flammability limit approaches a lower flammability limit in the chamber.

2. The neutralization and circulation module of claim 1, further comprising at least one sensor configured to generate the at least one signal.

3. The neutralization and circulation module of claim 2, wherein:
the at least one sensor comprises an analyte sensor,
the at least one attribute comprises a composition of the intake stream,
the at least one actuator comprises an actuator configured to selectively operate a valve controlling a flow rate of the oxygen-containing stream, and
the controller is configured to operate the valve such that a minimum oxygen level is maintained in the reactor.

4. The neutralization and circulation module of claim 3, wherein the controller is further configured to operate the valve such that a maximum oxygen level is maintained in the reactor.

5. The neutralization and circulation module of claim 1, further comprising:
at least one sensor configured to generate at least one signal in response to a presence of at least one chemical component in the intake stream; and,
the controller operably coupled to the at least one sensor, wherein:
the reactor comprises a plurality of reactor modules, each reactor module configured to initiate at least one reaction, and
the controller is configured to control the fluid communication of the intake stream with the plurality of reactor modules in response to the at least one signal.

6. The neutralization and circulation module of claim 2, wherein:
the at least one sensor comprises a temperature sensor, the at least one attribute comprises a thermal energy level in the reactor,
the at least one actuator comprises an actuator configured to selectively operate a heating element, and
the controller is configured to operate the heating element such that a minimum thermal energy level is maintained in at least a portion of the reactor.

7. The neutralization and circulation module of claim 1, wherein the system of lithium-based chemical energy storage units comprises a lithium-ion battery.

8. The neutralization and circulation module of claim 1, wherein the combustion suppressant gas stream is configured to circulate in an environment comprising anode and cathode inputs for the lithium-based chemical energy storage units.

9. The neutralization and circulation module of claim 1, wherein the combustion suppressant gas stream is discharged such that the upper flammability limit and the lower flammability limit intersect.

10. The neutralization and circulation module of claim 1, wherein the reactor comprises a pre-reaction region comprising a fan configured to maintain a minimum intake flow into the reactor.

11. The neutralization and circulation module of claim 10, wherein the controller is configured to operate the fan in response to a signal corresponding to at least one criterion.

12. The neutralization and circulation module of claim 11, wherein the at least one criterion comprises pressure.

13. The neutralization and circulation module of claim 11, wherein the at least one criterion comprises flow rate.

14. The neutralization and circulation module of claim 1, wherein the reactor further comprises at least one heater module configured to maintain a minimum thermal energy level in a reaction unit.

15. The neutralization and circulation module of claim 1, further comprising a cooling module configured to maintain a predetermined maximum thermal energy level in at least a portion of the reactor.

16. The neutralization and circulation module of claim 1, wherein the reactor comprises a porous media substrate coated with a catalytic material configured to promote oxidation of combustible gases.

17. The neutralization and circulation module of claim 16, wherein the catalytic material comprises a noble metal.

18. The neutralization and circulation module of claim 2, wherein the at least one sensor is configured to detect a concentration of flammable gas species in the chamber, wherein the controller is configured to activate the reactor in response to the concentration exceeding a predetermined threshold.

19. The neutralization and circulation module of claim 1, wherein the controller comprises a communication module configured to transmit status data to a remote device and to receive configuration data from a remote server.

20. The neutralization and circulation module of claim 1, wherein the intake port and the output port are positioned relative to one another such that operation of the intake port and/or the output port increases circulation in the chamber.

\* \* \* \* \*